US010970918B2

(12) United States Patent
Li et al.

(10) Patent No.: US 10,970,918 B2
(45) Date of Patent: Apr. 6, 2021

(54) IMAGE PROCESSING METHOD AND APPARATUS USING A PIXELATED MASK IMAGE AND TERMINAL ORIENTATION FOR A REFLECTION EFFECT

(71) Applicant: Huawei Technologies Co., Ltd., Shenzhen (CN)

(72) Inventors: Kang Li, Shenzhen (CN); Jun Liang, Shenzhen (CN); Liang Cheng, Beijing (CN); Zhuolin Yang, Beijing (CN); Shilong Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/614,934

(22) PCT Filed: May 19, 2017

(86) PCT No.: PCT/CN2017/085191
§ 371 (c)(1),
(2) Date: Nov. 19, 2019

(87) PCT Pub. No.: WO2018/209710
PCT Pub. Date: Nov. 22, 2018

(65) Prior Publication Data
US 2020/0193694 A1 Jun. 18, 2020

(51) Int. Cl.
*G06T 15/50* (2011.01)
*G06T 7/70* (2017.01)
*A63F 13/52* (2014.01)

(52) U.S. Cl.
CPC ............ *G06T 15/506* (2013.01); *A63F 13/52* (2014.09); *G06T 7/70* (2017.01); *G06T 15/50* (2013.01);
(Continued)

(58) Field of Classification Search
CPC ....... G06T 15/50; G06T 15/506; G06T 15/80; G06T 15/83; G06T 15/87; G06T 7/70;
(Continued)

(56) References Cited

U.S. PATENT DOCUMENTS 5,488,700 A   1/1996  Glassner
6,148,669 A * 11/2000  Roest ................ G01P 15/11
                                                    33/366.25
(Continued)

FOREIGN PATENT DOCUMENTS

CN      101336831 A      1/2009
CN      101354784 A      1/2009
(Continued)

OTHER PUBLICATIONS

Blinn, James F. "Connpositing. 1. theory." IEEE Computer Graphics and applications 14.5 (1994): 83-87. (Year: 1994).*
(Continued)

*Primary Examiner* — Daniel F Hajnik
(74) *Attorney, Agent, or Firm* — Conley Rose, P.C.

(57) ABSTRACT

An image processing method and an apparatus relate to the field of image processing and add a diffuse reflection effect to a projection image in real time and reduce a calculation volume of adding the diffuse reflection effect. The method includes obtaining a first image that includes a diffuse reflection object, where the first image is an image obtained when the diffuse reflection object is illuminated by a light source, obtaining a mask image corresponding to the diffuse reflection object, obtaining orientation information of a terminal and obtaining a second image based on the orientation information, the first image, and the mask image, where the second image is an image that includes the diffuse reflection object and a diffuse reflection effect and that is
(Continued)

generated by superposing the first image and the mask image moved based on the orientation information.

20 Claims, 23 Drawing Sheets

(52) U.S. Cl.
CPC ........ *G06T 15/503* (2013.01); *G06T 2215/08* (2013.01)

(58) Field of Classification Search
CPC ............. G06T 2215/08; G06T 2215/16; G06T 15/503; G06F 2200/1637; A63F 13/52; A63F 2300/66
See application file for complete search history.

(56) References Cited

U.S. PATENT DOCUMENTS

| | | |
|---|---|---|
| 2004/0001062 A1 | 1/2004 | Pharr |
| 2007/0046665 A1 | 3/2007 | Nakagawa et al. |
| 2011/0227922 A1 | 9/2011 | Shim |
| 2015/0116354 A1* | 4/2015 | Tomlin ................ G06F 3/04815 345/633 |
| 2016/0054235 A1 | 2/2016 | Kim et al. |
| 2019/0180409 A1* | 6/2019 | Moloney ................ G01C 21/20 |

FOREIGN PATENT DOCUMENTS

| | | |
|---|---|---|
| CN | 101794460 A | 8/2010 |
| CN | 101826214 A | 9/2010 |
| CN | 101882323 A | 11/2010 |
| CN | 102243768 A | 11/2011 |
| CN | 102346918 A | 2/2012 |
| CN | 105844695 A | 8/2016 |
| CN | 106056661 A | 10/2016 |
| CN | 106534835 A | 3/2017 |
| EP | 0253390 B1 | 12/1992 |

OTHER PUBLICATIONS

Tutorial—Dynamic Lightmaps in OpenGL. Joshbeam.com at http://joshbeam.com/articles/dynamic_lightmaps_in opengl/ Nov. 16, 2003. (Year: 2003).*
Machine Translation and Abstract of Chinese Publication No. CN101826214, Sep. 8, 2010, 13 pages.
Machine Translation and Abstract of Chinese Publication No. CN102243768, Nov. 16, 2011, 14 pages.
Machine Translation and Abstract of Chinese Publication No. CN101882323, Nov. 10, 2010, 22 pages.
Foreign Communication From a Counterpart Application, PCT Application No. PCT/CN2017/085191, English Translation of International Search Report dated Feb. 22, 2018, 2 pages.
Foreign Communication From a Counterpart Application, PCT Application No_ PCT/CN2017/085191, English Translation of Written Opinion dated Feb. 22, 2018, 4 pages.
Foreign Communication From a Counterpart Application, European Application No. 17910360.1, Extended European Search Report dated Feb. 6, 2020, 8 pages.
Kelley, E., et al., "Character-contrast measurements on emissive displays using replica masks under uniform ambient illumination," Nov. 2012, pp. 604-615.
Wang, S., "The Research of Real-time Rendering Technology on Character Skin," Apr. 2011, 82 pages.

* cited by examiner

IMAGE PROCESSING METHOD AND APPARATUS USING A PIXELATED MASK IMAGE AND TERMINAL ORIENTATION FOR A REFLECTION EFFECT

CROSS-REFERENCE TO RELATED APPLICATIONS

This application is a U.S. National Stage of International Patent Application No. PCT/CN2017/085191 filed on May 19, 2017, which is hereby incorporated by reference in its entirety.

TECHNICAL FIELD

This application relates to the field of image processing, and in particular, to an image processing method and an apparatus.

BACKGROUND

Diffuse reflection (diffuse reflection) is a phenomenon that light projected onto a rough surface is reflected in various directions. In some 3D scenarios (such as an animation movie or a game), a light reflection effect of an object being illuminated in the real world may be simulated to add a diffuse reflection effect to a projection image, so that a user feels that the user is personally on the scene.

Specifically, a diffuse reflection effect may be added to a projection image in the following manner: calculating, based on an assumed illumination condition and scenery appearance factor by using an illumination model and a reflective material of a three-dimensional object, intensity of light of a visible side projected into eyes of an observer, converting the light intensity into a color value suitable for a terminal, generating light intensity of each pixel in the projection image, and then displaying the three-dimensional object on the terminal device.

To implement diffuse reflection effects of the object under different illumination conditions, a plurality of illumination models need to be configured on the terminal, and a lot of calculations need to be performed. Therefore, the foregoing solution of adding a diffuse reflection effect to a projection image is usually applied to a personal computer (personal computer, PC). For a device with limited computing resources, for example, an embedded terminal (such as a mobile phone), the foregoing solution is not applicable because a computing capability is limited or allocated computing resources are limited, for example, a central processing unit (Central Processing Unit, CPU) and a graphics processing unit (Graphics Processing Unit, GPU) of an embedded terminal are usually of low configurations.

SUMMARY

This application provides an image processing method and an apparatus, so as to achieve a real-time diffuse reflection effect with fewer computing resources.

To achieve the foregoing objective, this application uses the following technical solutions.

According to a first aspect, this application provides an image processing method, where the image processing method is applied to a terminal and includes: obtaining a first image that includes a diffuse reflection object, where the first image is an image obtained when the diffuse reflection object is illuminated by a light source: obtaining a mask image corresponding to the diffuse reflection object; obtaining orientation information of the terminal: and obtaining a second image based on the orientation information, the first image, and the mask image, where the second image is an image that includes the diffuse reflection object and a diffuse reflection effect and that is generated by superposing the first image and the mask image moved based on the orientation information.

In this application, when the terminal adds the diffuse reflection effect for the diffuse reflection object in the first image, because the mask image may be moved dynamically based on the orientation information of the terminal, the terminal may obtain the image that includes the diffuse reflection object and the diffuse reflection effect and that is generated by superposing the first image and the mask image moved based on the orientation information. That is, a dynamic diffuse reflection effect may be added for the diffuse reflection object.

In addition, in this application, a plurality of illumination models do not need to be configured in the terminal during a process of adding the dynamic diffuse reflection effect for the diffuse reflection object. Instead, the pre-designed first image and the mask image moved based on the orientation information are superposed, and simple calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this application. In conclusion, according to this application, a real-time diffuse reflection effect may be achieved with fewer computing resources.

With reference to the first aspect, in a first possible implementation, the obtaining a second image based on the orientation information, the first image, and the mask image may include: calculating a color value after each pixel in the first image and each pixel at a corresponding position on the moved mask image are superposed, to obtain the second image. Color values of pixels in the first image are different, and transparency of pixels in the mask image is different. Different diffuse reflection effects may be achieved by superposing the different color values and the different transparency.

With reference to the first possible implementation, in a second possible implementation, the calculating a color value after each pixel in the first image and each pixel at a corresponding position on the moved mask image are superposed, to obtain the second image may include: performing step 1 for each pixel in the first image to obtain the second image, where step 1 is: calculating an after-superposition color value of a first pixel based on a color value of the first pixel and transparency of a pixel at a corresponding position on the moved mask image, where the first pixel is any pixel in the first image. For example, the after-superposition color value of the first pixel may be a product of the color value of the first pixel and the transparency of the pixel at the corresponding position on the moved mask image.

With reference to the second possible implementation, in a third possible implementation, to enhance authenticity of the second image, when the terminal generates the second image, reference may also be made to a third image obtained when no light source illuminates the diffuse reflection object. Specifically, before the obtaining a second image based on the orientation information, the first image, and the mask image, the method in this application may further include: obtaining a third image that includes a diffuse reflection object, where the third image is an image obtained when no light source illuminates the diffuse reflection object: and the calculating an after-superposition color value of a first pixel based on a color value of the first pixel and transparency of a pixel at a corresponding position on the moved mask image may include: calculating the after-superposition color value of the first pixel based on the color value of the first pixel, a color value of a pixel at a corresponding position on the third image, and the transparency of the pixel at the corresponding position on the moved mask image.

With reference to any one of the first aspect or the foregoing possible implementations, in a fourth possible implementation, to limit components (such as an x-axis component and a y-axis component) in the orientation information of the terminal to a specific range so as to facilitate subsequent data calculation or ensure faster convergence during program running, before the obtaining a second image based on the orientation information, the first image, and the mask image, the method in this application may further include: normalizing the orientation information; where the mask image is moved based on normalized orientation information.

According to a second aspect, this application provides an image processing method, where the image processing method is applied to a terminal and includes: obtaining a first image, where the first image includes a diffuse reflection object, and the first image is an image obtained when no light source illuminates the diffuse reflection object; obtaining a mask image corresponding to the diffuse reflection object; obtaining a light source; obtaining orientation information of the terminal; and obtaining a second image based on the orientation information, the first image, the light source, and the mask image, where the second image is an image that includes the diffuse reflection object and a diffuse reflection effect and that is generated by superposing the first image, the mask image, and a light source moved based on the orientation information.

In the image processing method provided in this application, when the terminal adds the diffuse reflection effect for the diffuse reflection object in the first image, because the light source may be moved dynamically based on the orientation information of the terminal, the terminal may obtain the image that includes the diffuse reflection object and the diffuse reflection effect and that is generated by superposing the first image, the mask image, and the light source moved based on the orientation information. That is, a dynamic diffuse reflection effect may be added for the diffuse reflection object.

In addition, in this application, a plurality of illumination models do not need to be configured in the terminal during a process of adding the dynamic diffuse reflection effect for the diffuse reflection object. Instead, the pre-designed first image, the mask image, and the light source moved based on the orientation information are superposed, and simple calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this application.

In conclusion, according to this solution, a diffuse reflection effect can be added to a projection image in real time, and a calculation volume required for adding the diffuse reflection effect may be also reduced.

With reference to the second aspect, in a first possible implementation, the light source may a light source image, the obtaining a second image based on the orientation information, the first image, the light source, and the mask image may include: calculating a color value after each pixel in the first image, each pixel at a corresponding position on the mask image, and each pixel at a corresponding position on a moved light source image are superposed, to obtain the second image. Color values of pixels in the first image are different, and transparency of pixels in the mask image is different. Different diffuse reflection effects may be achieved by superposing the different color values and the different transparency.

With reference to the first possible implementation, in a second possible implementation, the calculating a color value after each pixel in the first image, each pixel at a corresponding position on the mask image, and each pixel at a corresponding position on a moved light source image are superposed, to obtain the second image may include: performing step 1 for each pixel in the first image to obtain the second image, where step 1 is: calculating an after-superposition color value of a first pixel based on a color value of the first pixel, transparency of a pixel at a corresponding position on the mask image, and a color value of a pixel at a corresponding position on the moved light source image, where the first pixel is any pixel in the first image. For example, the after-superposition color value of the first pixel may be the color value of the first pixel plus a product of the transparency of the pixel at the corresponding position on the mask image and the color value of the pixel at the corresponding position on the moved light source image.

With reference to any one of the second aspect or the foregoing possible implementations, in a third possible implementation, to limit components (such as an x-axis component and a y-axis component) in the orientation information of the terminal to a specific range so as to facilitate subsequent data calculation or ensure faster convergence during program running, before the obtaining a second image based on the orientation information, the first image, the light source, and the mask image, the method in this application may further include: normalizing the orientation information: where the light source is moved based on normalized orientation information.

According to a third aspect, this application provides a terminal, where the terminal includes: a first obtaining module, a second obtaining module, a third obtaining module, and a diffuse reflection module. The first obtaining module is configured to obtain a first image, where the first image includes a diffuse reflection object, and the first image is an image obtained when the diffuse reflection object is illuminated by a light source; the second obtaining module is configured to obtain a mask image corresponding to the diffuse reflection object; the third obtaining module is configured to obtain orientation information of the terminal; and the diffuse reflection module is configured to obtain a second image based on the orientation information obtained by the third obtaining module, the first image obtained by the first obtaining module, and the mask image obtained by the second obtaining module, where the second image is an image that includes the diffuse reflection object and a diffuse reflection effect and that is generated by superposing the first image and the mask image moved based on the orientation information.

With reference to the third aspect, in a first possible implementation, the diffuse reflection module is specifically configured to: calculate a color value after each pixel in the first image and each pixel at a corresponding position on the moved mask image are superposed, to obtain the second image.

With reference to the first possible implementation, in a second possible implementation, the diffuse reflection module is specifically configured to: perform step 1 for each pixel in the first image to obtain the second image; where step 1 is: calculating an after-superposition color value of a first pixel based on a color value of the first pixel and transparency of a pixel at a corresponding position on the moved mask image, where the first pixel is any pixel in the first image.

With reference to the second possible implementation, in a third possible implementation, the terminal may further include: a fourth obtaining module. The fourth obtaining module is configured to obtain a third image before the diffuse reflection module obtains the second image based on the orientation information obtained by the third obtaining module, the first image obtained by the first obtaining module, and the mask image obtained by the second obtaining module, where the third image includes a diffuse reflection object, and the third image is an image obtained when no light source illuminates the diffuse reflection object; and correspondingly, the diffuse reflection module is specifically configured to: calculate the after-superposition color value of the first pixel based on the color value of the first pixel, a color value of a pixel at a corresponding position on the third image, and the transparency of the pixel at the corresponding position on the moved mask image.

With reference to any one of the third aspect or the foregoing possible implementations, in a fourth possible implementation, the terminal may further include: a normalization module. The normalization module is configured to normalize the orientation information before the diffuse reflection module obtains the second image based on the orientation information obtained by the third obtaining module, the first image obtained by the first obtaining module, and the mask image obtained by the second obtaining module; where the mask image is moved based on normalized orientation information.

According to a fourth aspect, this application provides a terminal, where the terminal includes: one or more processors, a memory, and a display, where the memory and the display are coupled to the one or more processors; the memory is configured to store computer program code, and the computer program code includes a computer instruction; when the one or more processors execute the computer instruction, the terminal performs the image processing method according to any one of the first aspect or the possible implementations of the first aspect in this application; and the display is configured to display a second image obtained by performing the image processing method by the processor.

With reference to the fourth aspect, in a first possible implementation, the memory is further configured to store a first image.

With reference to the fourth aspect or the first possible implementation, in a second possible implementation, the memory is further configured to store one or more mask images. The mask image corresponding to the diffuse reflection object is one of the one or more mask images.

With reference to any one of the fourth aspect or the foregoing possible implementations, the terminal may further include: a motion sensor, where the motion sensor may be an orientation sensor. The motion sensor is configured to collect orientation information of the terminal.

According to a fifth aspect, this application further provides a computer storage medium. The computer storage medium stores a computer instruction, where when the computer instruction runs on a terminal, the terminal is enabled to perform the image processing method according to any one of the first aspect or the possible implementations of the first aspect in this application.

According to a sixth aspect, this application further provides a computer program product, where when the computer program product runs on a computer, the computer is enabled to perform the image processing method according to any one of the second aspect or the possible implementations of the second aspect in this application.

It can be understood that the terminal described in the third aspect, the terminal described in the fourth aspect, the computer storage medium described in the fifth aspect, or the computer program product described in the sixth aspect is used to perform the corresponding method provided above. Therefore, for beneficial effects that can be achieved, refer to beneficial effects in the corresponding method provided above. Details are not described herein again.

According to a seventh aspect, this application provides a terminal, where the terminal includes: a first obtaining module, a second obtaining module, a third obtaining module, a fourth obtaining module, and a diffuse reflection module. The first obtaining module is configured to obtain a first image, where the first image includes a diffuse reflection object, and the first image is an image obtained when no light source illuminates the diffuse reflection object; the second obtaining module is configured to obtain a mask image corresponding to the diffuse reflection object; the third obtaining module is configured to obtain a light source: the fourth obtaining module is configured to obtain orientation information of the terminal: and the diffuse reflection module is configured to obtain a second image based on the orientation information obtained by the fourth obtaining module, the first image obtained by the first obtaining module, the light source obtained by the third obtaining module, and the mask image obtained by the second obtaining module, where the second image is an image that includes the diffuse reflection object and a diffuse reflection effect and that is generated by superposing the first image, the mask image, and a light source moved based on the orientation information.

With reference to the seventh aspect, in a first possible implementation, the light source obtained by the third obtaining module is a light source image; and the diffuse reflection module is specifically configured to: calculate a color value after each pixel in the first image, each pixel at a corresponding position on the mask image, and each pixel at a corresponding position on a moved light source image are superposed, to obtain the second image.

With reference to the first possible implementation, in a second possible implementation, the diffuse reflection module is specifically configured to: perform step 1 for each pixel in the first image to obtain the second image; where step 1 is: calculating an after-superposition color value of a first pixel based on a color value of the first pixel, transparency of a pixel at a corresponding position on the mask image, and a color value of a pixel at a corresponding position on the moved light source image, where the first pixel is any pixel in the first image.

With reference to any one of the seventh aspect or the foregoing possible implementations, in a second possible implementation, the terminal may further include: a normalization module. The normalization module is configured to normalize the orientation information before the diffuse reflection module obtains the second image based on the orientation information, the first image, the light source, and the mask image; where the light source is moved based on normalized orientation information.

According to an eighth aspect, this application provides a terminal, where the terminal includes: one or more processors, a memory, and a display, where the memory and the display are coupled to the one or more processors; the memory is configured to store computer program code, and the computer program code includes a computer instruction; when the one or more processors execute the computer instruction, the terminal performs the image processing method according to any one of the second aspect or the possible implementations of the second aspect in this application; and the display is configured to display an image obtained by performing the image processing method by the processor.

With reference to the eighth aspect, in a first possible implementation, the memory is further configured to store a first image.

With reference to the eighth aspect or the first possible implementation, in a second possible implementation, the memory is further configured to store one or more mask images. The mask image corresponding to the diffuse reflection object is one of the one or more mask images.

With reference to any one of the eighth aspect or the foregoing possible implementations, the memory may be further configured to store one or more light source images. The light source image corresponding to the diffuse reflection object is one of the one or more light source images.

With reference to any one of the eighth aspect or the foregoing possible implementations, the terminal may further include: a motion sensor, where the motion sensor may be an orientation sensor. The motion sensor is configured to collect orientation information of the terminal.

According to a ninth aspect, this application further provides a computer storage medium. The computer storage medium stores a computer instruction, where when the computer instruction runs on a terminal, the terminal is enabled to perform the image processing method according to any one of the second aspect or the possible implementations of the second aspect in this application.

According to a tenth aspect, this application further provides a computer program product, where when the computer program product runs on a computer, the computer is enabled to perform the image processing method according to any one of the second aspect or the possible implementations of the second aspect in this application.

It can be understood that the terminal described in the seventh aspect, the terminal described in the eighth aspect, the computer storage medium described in the ninth aspect, or the computer program product described in the tenth aspect is used to perform the corresponding method provided above. Therefore, for beneficial effects that can be achieved, refer to beneficial effects in the corresponding method provided above. Details are not described herein again.

DESCRIPTION OF EMBODIMENTS

Embodiments of the present invention provide an image processing method. The image processing method may be applied to a terminal, and specifically may be applied to a process in which the terminal processes an image and adds a diffuse reflection effect for an object in the image. Diffuse reflection (diffuse reflection) in the embodiments of the present invention is a phenomenon that light projected onto a rough surface is reflected in various directions. For the diffuse reflection in the embodiments of the present invention, refer to a detailed description of diffuse reflection on a web page corresponding to the following website 1, and details are not described herein. Website 1: https://en.wikipedia.org/wiki/Diffuse_reflection.

Figure 1A:
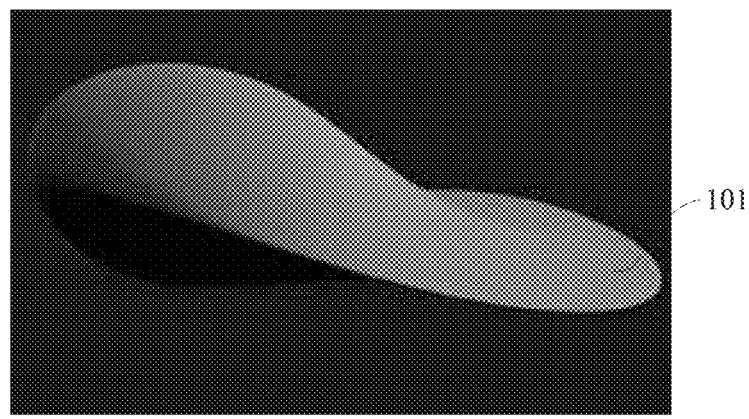
FIG. 1A and FIG. 1B are a schematic diagram of a comparison example of diffuse reflection effects according to an embodiment of the present invention.
Figure 1B:
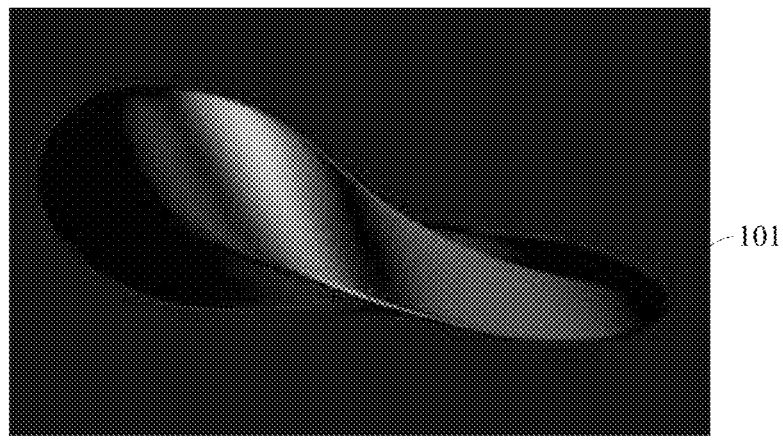

FIG. 1A and FIG. 1B are a schematic diagram of a comparison example of diffuse reflection effects according to an embodiment of the present invention. An image shown in FIG. 1A is an image in which no diffuse reflection effect is added to an object (object) 101, and an image shown in FIG. 1B is an image in which a diffuse reflection effect is added to the object 101. For example, a terminal in this embodiment of the present invention may be a mobile terminal provided with an acceleration sensor and a geomagnetic sensor or further provided with a motion sensor (for example, an orientation sensor). The motion sensor may be configured to obtain orientation information of the terminal based on information collected by the acceleration sensor. For example, the orientation information may be information indicating a rotation angle of the terminal. For example, angle information (pitch that is an included angle between an x axis and the horizontal, and has a range from −180° to 180°, where the pitch is a positive value when a z axis rotates towards a y axis; and roll that is an included angle between the y axis and the horizontal, and has a range from −90° to 90° due to a historical reason, where the roll is a positive value when the x axis moves towards the z axis) of the terminal may be included. Certainly, the terminal may further receive orientation information sent by another device, and no motion sensor needs to be configured to collect orientation information. This is not limited in this embodiment of the present invention.

For example, the terminal in this embodiment of the present invention may be a mobile phone, a wearable device, an augmented reality (augmented reality, AR) or virtual reality (virtual reality, VR) device, a tablet computer, a notebook computer, an ultra-mobile personal computer (ultra-mobile personal computer, UMPC), a netbook, a personal digital assistant (personal digital assistant, PDA), or the like. This is not limited in this embodiment of the present invention.

Figure 2:
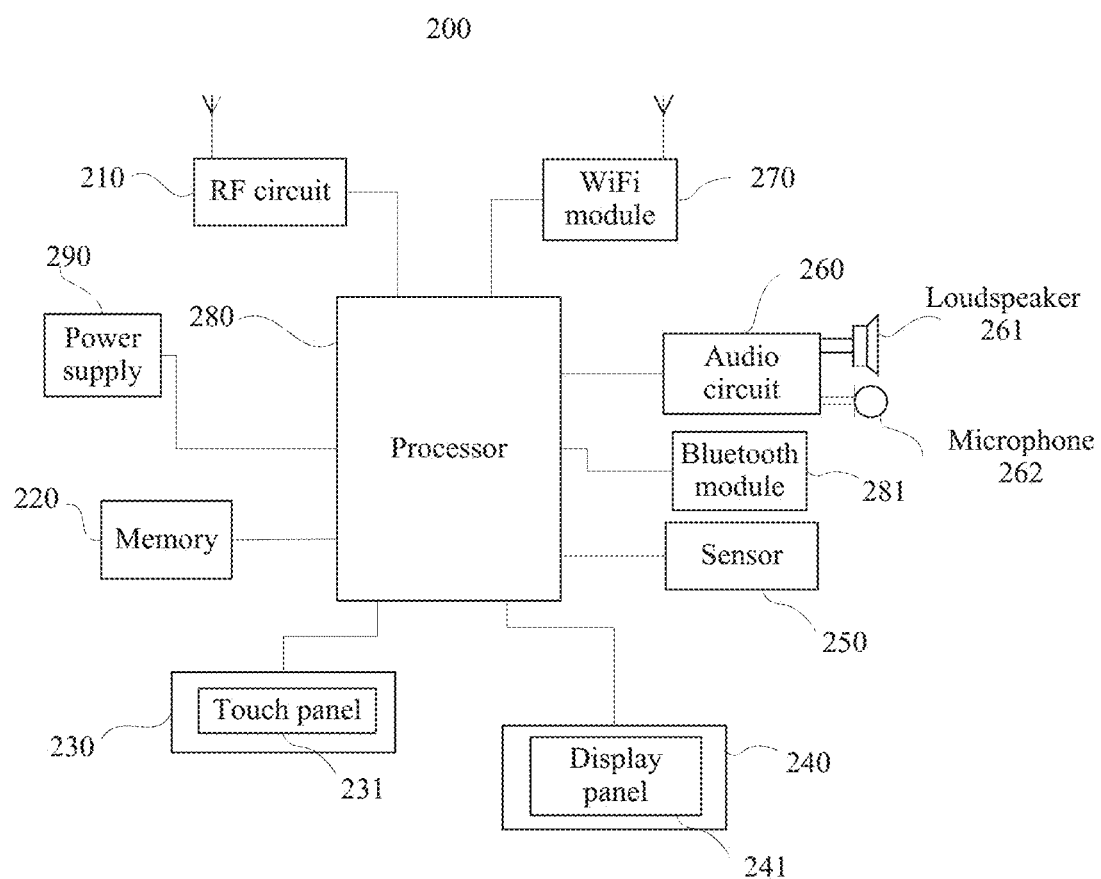
FIG. 2 is a schematic diagram of a hardware structure of a mobile phone according to an embodiment of the present invention.

The following embodiment uses a mobile phone as an example to describe how a terminal implements the specific technical solutions in the embodiments. As shown in FIG. 2, the terminal in this embodiment may be a mobile phone 200. The following uses the mobile phone 200 as an example to specifically describe the embodiment.

It should be understood that the mobile phone 200 shown in the figure is merely an example of a terminal, and the mobile phone 200 may have more or fewer components than those shown in the figure, or may have a combination of two or more components, or may have differently disposed components. Components shown in FIG. 2 may be implemented by hardware, including one or more signal processing and/or application-specific integrated circuits, software, or a combination of hardware and software.

As shown in FIG. 2, the mobile phone 200 includes components such as an RF (Radio Frequency, radio frequency) circuit 210, a memory 220, an input unit 230, a display unit 240, a sensor 250, an audio circuit 260, a Wireless Fidelity (Wireless Fidelity, Wi-Fi) module 270, a processor 280, and a power supply 290. A person skilled in the art can understand that a mobile phone structure shown in FIG. 2 does not constitute any limitation on the mobile phone, and the mobile phone may include more or fewer components than those shown in the figure, or a combination of some components, or differently disposed components.

The following specifically describes constituent components of the mobile phone 200 with reference to FIG. 2.

The RF circuit 210 may be configured to receive and send a signal in a process of receiving and sending information or in a call process. After receiving downlink information of a base station, the RF circuit 210 may send the downlink information to the processor 280 for processing. In addition, the RF circuit 210 sends related uplink data to the base station. Usually, the RF circuit includes but is not limited to an antenna, at least one amplifier, a transceiver, a coupler, a low noise amplifier, a duplexer, and another component. In addition, the RF circuit 210 may further communicate with a network and another mobile device through wireless communication. The wireless communication may use any communications standard or protocol, including but not limited to a global system for mobile communications, a general packet radio service, Code Division Multiple Access, Wideband Code Division Multiple Access, Long Term Evolution, an email, a short message service, and the like.

The memory 220 may be configured to store a software program and data. The processor 280 runs the software program and the data that are stored in the memory 220, so as to perform various functions and data processing of the mobile phone 200. The memory 220 may mainly include a program storage area and a data storage area. The program storage area may store an operating system, an application program required by at least one function (such as a voice playback function and an image playback function), and the like. The data storage area may store data (such as audio data and a phone book) that is created based on use of the mobile phone 200, and the like. In addition, the memory 220 may include a high-speed random access memory, and may further include a non-volatile memory such as at least one magnetic disk storage device, a flash memory device, or another volatile solid-state storage device. In the following embodiments, the memory 220 stores an operating system that enables the mobile phone 200 to run, for example, an iOS® operating system developed by Apple Inc., an Android® open source operating system developed by Google Inc., or a Windows® operating system developed by Microsoft Corporation.

The input unit 230 (such as a touchscreen) may be configured to receive input digital or character information, and generate signal input related to a user setting and function control of the mobile phone 200. Specifically, the input unit 230 may include a touch panel 231, which may collect a touch operation performed by a user on or near the touch panel 231 (for example, an operation performed on the touch panel 231 or near the touch panel 231 by the user by using a finger, a stylus, or any other suitable object or accessory), and drive a corresponding connection apparatus according to a preset program. Optionally, the touch panel 231 may include two parts: a touch detection apparatus and a touch controller (not shown in FIG. 2). The touch detection apparatus detects a touch orientation of the user, detects a signal generated by a touch operation, and transmits the signal to the touch controller. The touch controller receives touch information from the touch detection apparatus, converts the touch information into touchpoint coordinates, and sends the touchpoint coordinates to the processor 280, and can receive an instruction sent from the processor 280 and execute the instruction. In addition, the touch panel 231 may be implemented in a plurality of types, such as a resistive type, a capacitive type, an infrared type, and a surface acoustic wave type.

The display unit 240 (that is, a display screen) may be configured to display information input by the user or information provided for the user, and a graphical user interface (Graphical User Interface, GUI) of various menus of the mobile phone 200. The display unit 240 may include a display panel 241 disposed on the front of the mobile phone 200. The display panel 241 may be configured in a form such as a liquid crystal display or a light-emitting diode.

In some embodiments, an optical touch button may be further disposed at the bottom of the front of the mobile phone 200. The touch panel 231 and the display panel 241 are further disposed, and the touch panel 231 covers the display panel 241. After detecting a touch operation on or near the touch panel 231, the touch panel 231 transfers the touch operation to the processor 280 to determine a touch event. Then, the processor 280 provides corresponding visual output on the display panel 241 based on a type of the touch event. In FIG. 2, the touch panel 231 and the display panel 241 act as two independent components to implement input and output functions of the mobile phone 200. However, in some embodiments, the touch panel 231 and the display panel 241 may be integrated to implement the input and output functions of the mobile phone 200. The integrated touch panel 231 and display panel 241 may be referred to as a touch display screen for short.

In some other embodiments, a pressure sensor may be further disposed on the touch panel 231. Thus, when the user performs a touch operation on the touch panel, the touch panel may further detect pressure of the touch operation, and then the mobile phone 200 can detect the touch operation more accurately.

The mobile phone 200 may further include at least one sensor 250, such as a light sensor, a motion sensor, and another sensor. Specifically, a light sensor may include an ambient light sensor and a proximity light sensor. As shown in FIG. 1A, an ambient light sensor 251 may adjust luminance of the display panel 241 based on brightness of ambient light. A proximity light sensor 252 is disposed on the front of the mobile phone 200. When the mobile phone 200 is moved to an ear, the mobile phone 200 powers off the display panel 241 based on detection of the proximity light sensor 252. In this way, quantity of electricity of the mobile phone 200 may be further saved. As a type of motion sensor, an accelerometer sensor may detect magnitudes of accelerations in various directions (usually, three axes), may detect a magnitude and a direction of gravity when the mobile phone 200 is stationary, and may be used in an application used for recognizing a mobile phone posture (such as landscape-portrait mode switching, a related game, or magnetometer posture calibration), a vibration recognition-related function (such as a pedometer function or tapping), and the like. For another sensor that may be disposed in the mobile phone 200, such as a gyroscope, a barometer, a hygrometer, a thermometer, or an infrared sensor, details are not described herein.

The audio circuit 260, a loudspeaker 261, and a microphone 262 may provide an audio interface between the user and the mobile phone 200. The audio circuit 260 may transmit, to the loudspeaker 261, an electrical signal converted from received audio data, and the loudspeaker 261 converts the electrical signal into a sound signal for output. In addition, the microphone 262 converts a collected sound signal into an electrical signal, and the audio circuit 260 receives the electrical signal, converts the electrical signal into audio data, and then outputs the audio data to the RF circuit 210, so that the audio data is sent to, for example, another mobile phone, or outputs the audio data to the memory 220 for further processing.

Wi-Fi is a short-range wireless transmission technology. The mobile phone 200, by using the Wi-Fi module 270, may help the user receive and send an email, browse a web page, access streaming media, and the like. The Wi-Fi module 270 provides wireless access to the broadband Internet for the user.

The processor 280 is a control center of the mobile phone 200, and is connected to various parts of the entire mobile phone by using various interfaces and lines. By running or executing the software program stored in the memory 220 and by invoking the data stored in the memory 220, the processor 280 performs various functions of the mobile phone 200 and processes data, so as to perform overall monitoring on the mobile phone. In some embodiments, the processor 280 may include one or more processing units. The processor 280 may further integrate an application processor and a modem processor. The application processor mainly processes an operating system, a user interface, an application program, and the like. The modem processor mainly processes wireless communication. It can be understood that the modem processor may not be integrated into the processor 180.

A Bluetooth module 281 is configured to exchange information with another device by using the Bluetooth short-range communications protocol. For example, the mobile phone 200 may set up, by using the Bluetooth module 281, a Bluetooth connection to a wearable electronic device (for example, a smartwatch) that also has a Bluetooth module, so as to exchange data.

The mobile phone 200 further includes the power supply 290 (such as a battery) that supplies power to various components. The power supply may be logically connected to the processor 280 by using a power supply management system, so as to implement functions such as charging management, discharging management, and power consumption management by using the power supply management system. It can be understood that, in the following embodiments, the power supply 290 may be configured to supply power to the display panel 241 and the touch panel 231.

Methods in the following embodiments may be implemented in the mobile phone 200 with the hardware structure.

It can be understood that method steps in the following embodiments of the present invention may be performed by the foregoing terminal, or an execution body of the image processing methods provided in the embodiments of the present invention may alternatively be some function modules in the terminal, for example, a central processing unit (Central Processing Unit, CPU) of the terminal. This is not limited in the embodiments of the present invention. Herein, the embodiments of the present invention describe in detail, by using an example in which a terminal performs the image processing method, the image processing methods provided in the embodiments of the present invention.

Figure 3:
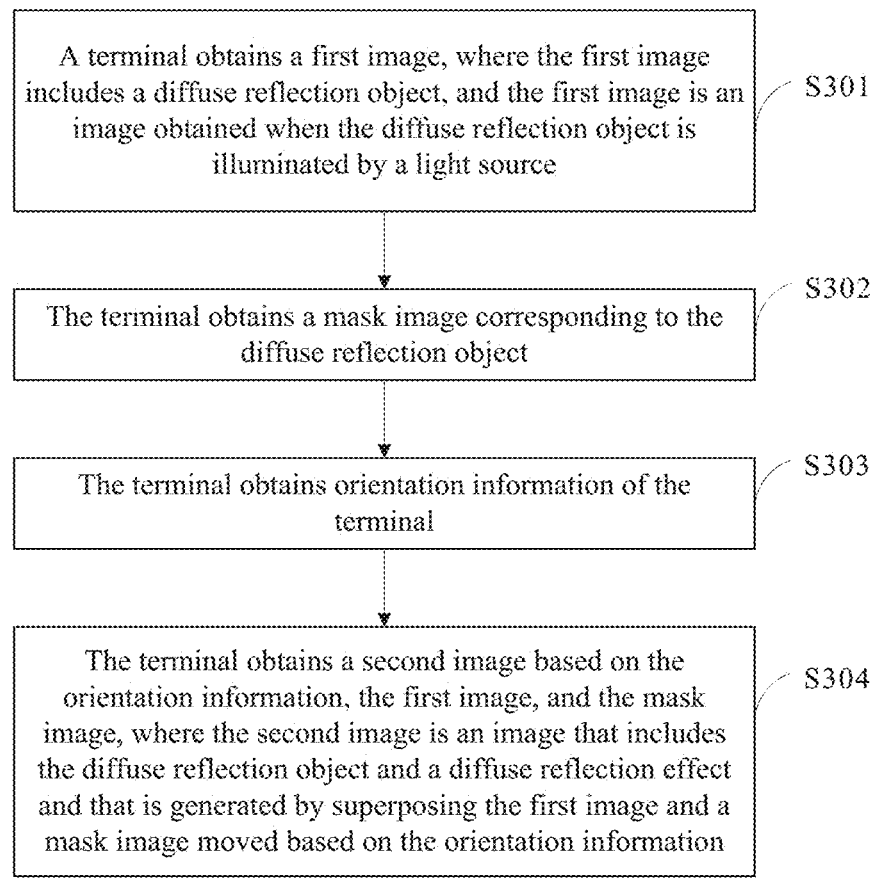
FIG. 3 is a flowchart 1 of an image processing method according to an embodiment of the present invention.

An embodiment of the present invention provides an image processing method, as shown in FIG. 3. The image processing method may include S301 to S304.

S301: A terminal obtains a first image, where the first image includes a diffuse reflection object, and the first image is an image obtained when the diffuse reflection object is illuminated by a light source.

The first image may be an image stored in the terminal in advance, or the first image may be an image obtained by the terminal from another device, or the first image may be an image that is sent by another device and received by the terminal.

For example, the first image may be an image that includes the diffuse reflection object and that is drawn by a designer by using image processing software (three-dimensional software, for example, 3 ds max), and then is stored in the terminal or transmitted to the terminal by using another device.

For example, the image processing software 3 ds max is used as an example. The designer may add a VRay standard material ball in 3 ds max for the diffuse reflection object (for example, a diffuse reflection object 101 shown in FIG. 1A), adjust an inherent color and reflection of the VRay standard material ball, and set an attribute of a bi-directional reflectance distribution function (Bi-directional Reflectance Distribution Function, BRDF) of the VRay standard material ball to Ward: use a surface light source, a spotlight, and a floodlight to light the diffuse reflection object, and adjust a light position, brightness, a color, and a light scope; and remove a specular effect of a main light source, and retain a diffuse reflection effect, that is, remove a specular effect from the diffuse reflection object, and retain only an inherent color of the diffuse reflection object. Therefore, an image 401 shown in FIG. 4 may be obtained. Then, the designer may enable the specular effect of the main light source in 3 ds max, and continue to process the image 401 shown in FIG. 4: and adjust a light size of the main light source to control a diffuse reflection scope, adjust intensity of the main light source to control brightness, and move light to control the diffuse reflection scope. Therefore, a first image 501 shown in FIG. 5 may be obtained. The first image may alternatively be obtained by using another prior art.

S302: The terminal obtains a mask image corresponding to the diffuse reflection object.

The mask image may be an image stored in the terminal in advance, or the mask image may be an image obtained by the terminal from another device, or the mask image may be an image that is sent by another device and received by the terminal.

For example, a plurality of mask images may be stored in the terminal in advance. After obtaining the first image, the terminal may obtain, from the plurality of mask images stored in advance, a mask image corresponding to the diffuse reflection object. Alternatively, after obtaining the first image, the terminal may send a mask image obtaining request to the another device to obtain a mask image corresponding to the diffuse reflection object.

Figure 6:
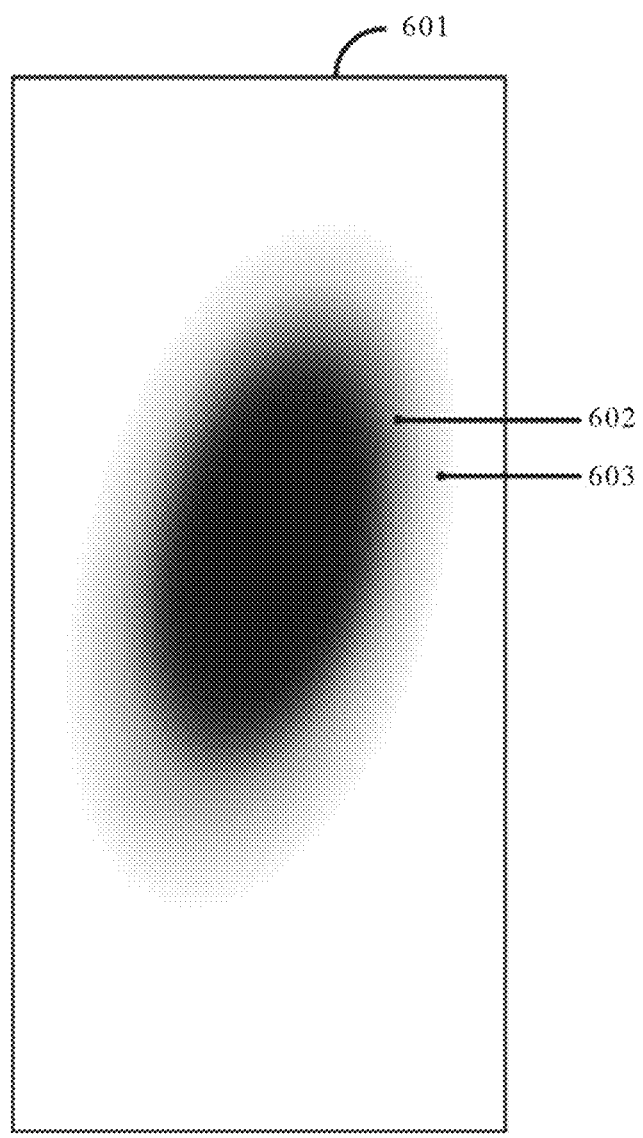
FIG. 6 is a schematic diagram of an example of a mask image according to an embodiment of the present invention.

A mask image may be an image including a mask pattern. The mask pattern is a pattern formed by different transmittance intensities (that is, transparency) of pixels in the mask image. A pattern on a mask is not displayed, and merely plays a role in light transmission. It is assumed that the mask pattern is a transparent perfect circle. Then, light penetrates through the circle, and shines on a masked layer below, and only a circular pattern is displayed. If the mask has no pattern and is not transparent at all, light cannot penetrate to the masked layer below, and nothing is displayed on the masked layer below. The mask image is different from the first image, and may be an image unrelated to the diffuse reflection object. The mask may also be referred to as a mask layer. Refer to https://en.wikipedia.org/wiki/Layers (digital image editing). For example, transparency of a pixel 602 and transparency of a pixel 603 in a mask image 601 shown in FIG. 6 are different. That the mask image is corresponding to the diffuse reflection object may specifically be: The mask pattern in the mask image is corresponding to a shape of the diffuse reflection object.

The mask image in this embodiment of the present invention may alternatively be designed by the designer for the diffuse reflection object. The designer may design one or more mask images for each diffuse reflection object. The terminal may select a mask image based on a specific scenario requirement, such as an indoor scenario, a night scene (neon), seaside, or a floral window.

S303: The terminal obtains orientation information of the terminal.

For example, the terminal in this embodiment of the present invention may be provided with a motion sensor. The motion sensor may be configured to collect the orientation information of the terminal, and the terminal may obtain the orientation information collected by the motion sensor. Alternatively, the terminal may receive orientation information sent by another device (for example, a device that sends the first image to the terminal). A specific manner in which the terminal obtains the orientation information of the terminal is not limited in this embodiment of the present invention, provided that information about a rotation direction and angle of the terminal is obtained.

S304: The terminal obtains a second image based on the orientation information, the first image, and the mask image, where the second image is an image that includes the diffuse reflection object and a diffuse reflection effect and that is generated by superposing the first image and the mask image moved based on the orientation information.

Figure 7:
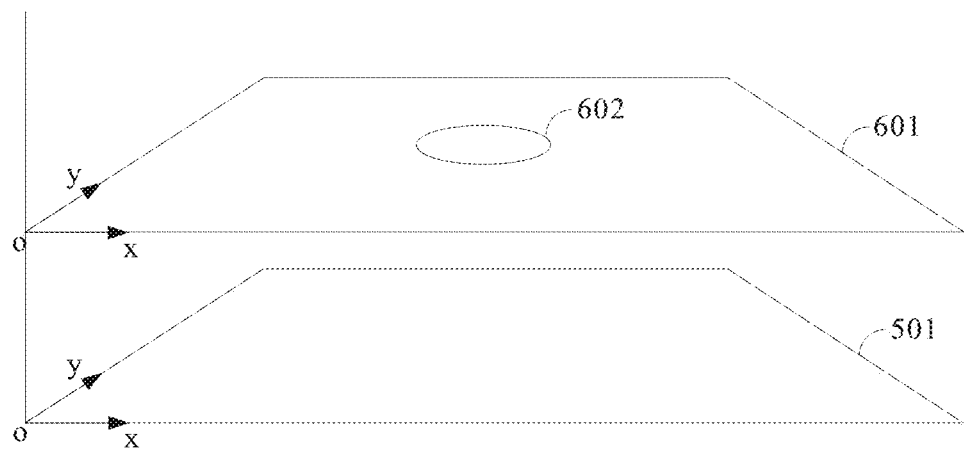
FIG. 7 is a schematic diagram 1 of an example of superposing a first image and a mask image according to an embodiment of the present invention.
Figure 8A:
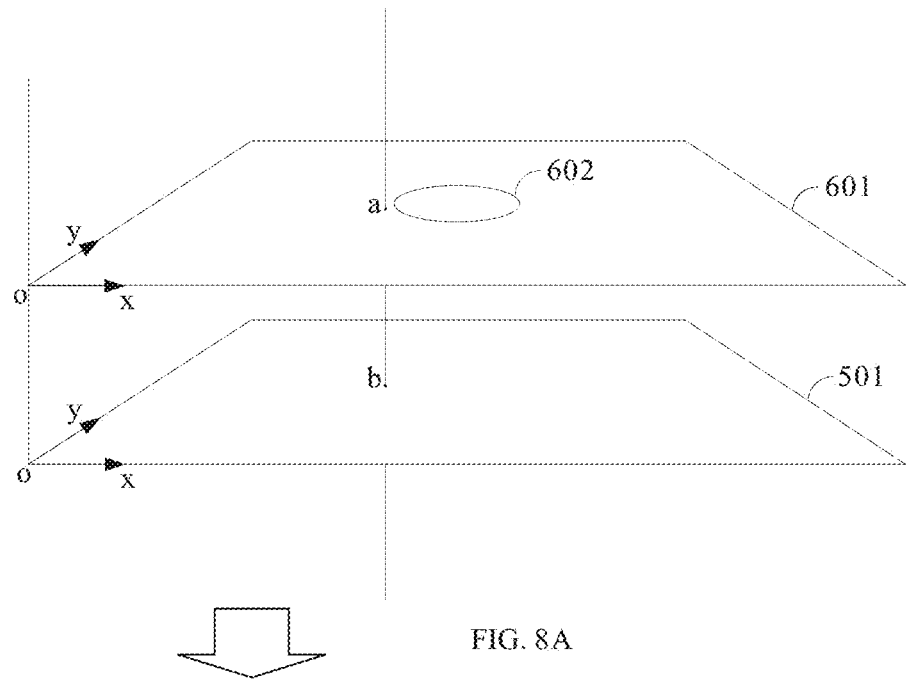
FIG. 8A and FIG. 8B are a schematic diagram 2 of an example of superposing a first image and a mask image according to an embodiment of the present invention.
Figure 8B:
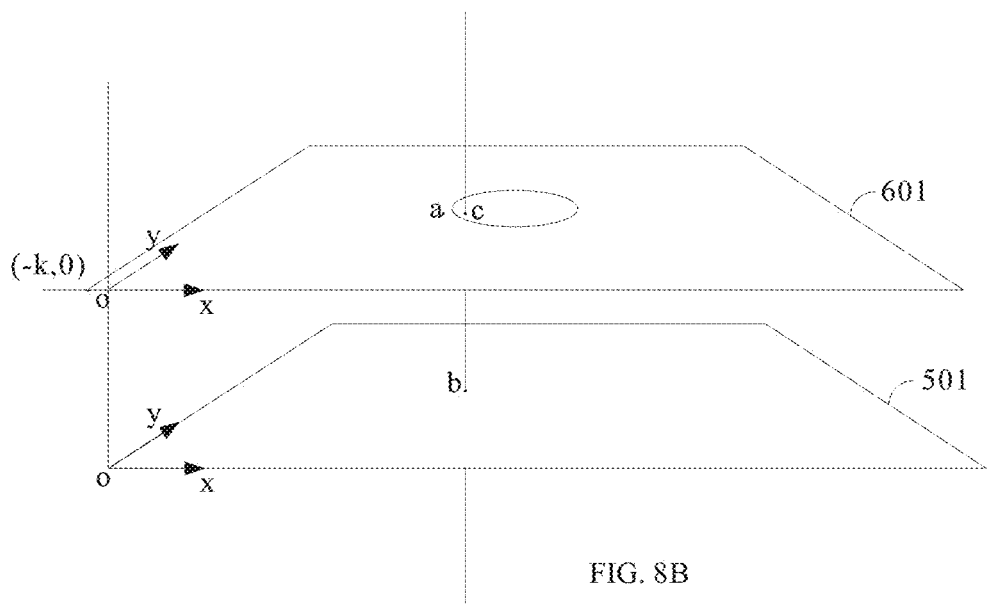

For example, as shown in FIG. 7, a first image 501 and a mask image 601 corresponding to a diffuse reflection object in the first image may be superposed. In addition, as shown in FIG. 8A, when the terminal does not make orientational movement (that is, the terminal does not move relatively to preset xy coordinate axes), the first image 501 and the mask image 601 may be aligned with each other. For example, a pixel b in the first image 501 is corresponding to a pixel a in the mask image 601. When the terminal moves k to a negative half-axis of the x axis of the xy coordinate axes, as shown in FIG. 8B, the mask image 601 may also move k to the negative half-axis of the x axis of the xy coordinate axes based on the orientation information. In this case, the pixel b in the first image 501 is corresponding to a pixel c in the mask image 601.

It can be understood that color values of pixels in the first image are different, transparency of pixels in the mask image is different, and different diffuse reflection effects may be achieved by superposing the different color values and the different transparency. Therefore, a diffuse reflection effect produced by superposing the pixel b in the first image 501 and the pixel a in the mask image 601 that are shown in FIG. 8A is different from a diffuse reflection effect produced by superposing the pixel b in the first image 501 and the pixel c in the mask image 601 that are shown in FIG. 8B.

Figure 9A:
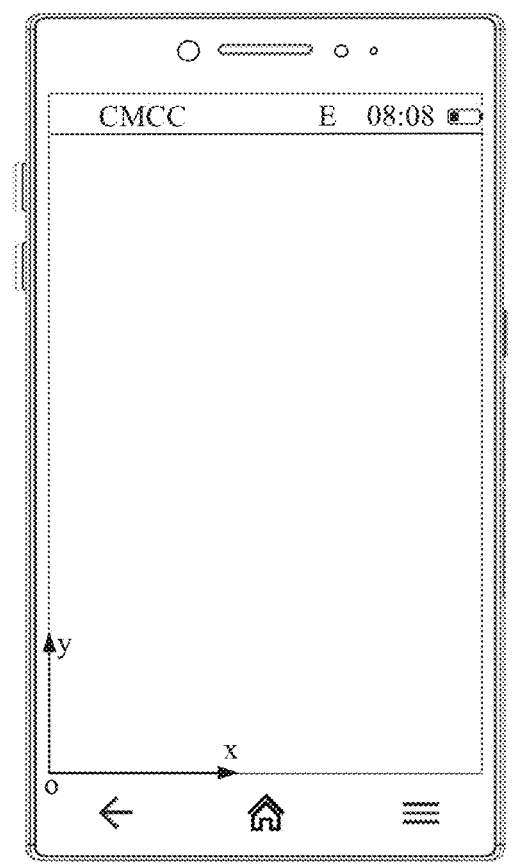
FIG. 9A and FIG. 9B are a schematic diagram 1 of an example of coordinate axes on a mobile phone according to an embodiment of the present invention.
Figure 9B:
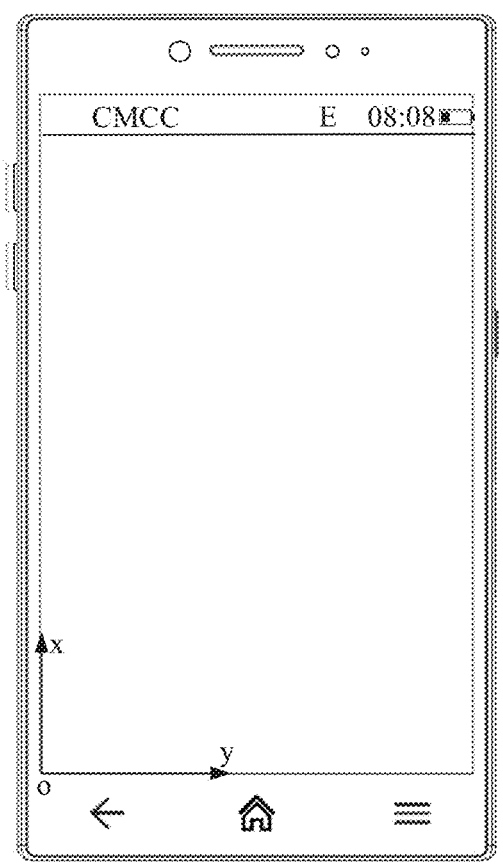

For example, the mobile phone 200 shown in FIG. 2 is used as an example. As shown in FIG. 9A, a short side of the mobile phone 200 is used as the x axis of the xy coordinate axes shown in FIG. 8A and FIG. 8B, any long side intersecting with the short side is the y axis, and an intersection of the long side and the short side is a coordinate origin o. Alternatively, as shown in FIG. 9B, a long side of the mobile phone 200 is used as the x axis of the xy coordinate axes shown in FIG. 8A and FIG. 8B, any short side intersecting with the long side is the y axis, and an intersection of the long side and the short side is a coordinate origin o.

Figure 10:
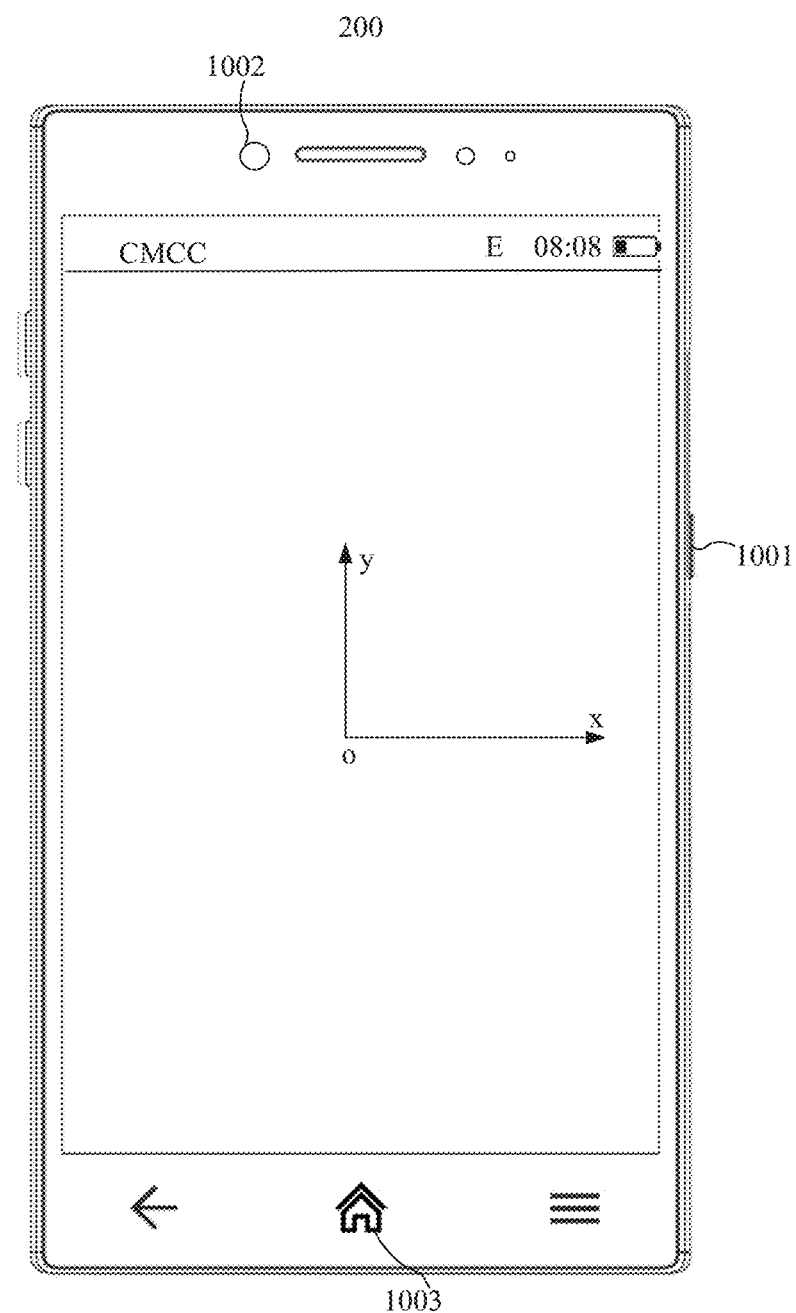
FIG. 10 is a schematic diagram 2 of an example of coordinate axes on a mobile phone according to an embodiment of the present invention.

Alternatively, the mobile phone 200 shown in FIG. 2 is used as an example. As shown in FIG. 10, a central point (that is, an intersection of a midpoint of a short side and a midpoint of a long side) of the screen of the mobile phone 200 may be used as a coordinate origin o, the x axis is parallel to a short side of the mobile phone 200, and the y axis is parallel to a long side of the mobile phone. Alternatively, the x axis may be parallel to a long side of the mobile phone 200, and the y axis is parallel to a short side of the mobile phone. This is not limited in this embodiment of the present invention.

For example, the coordinate axes shown in FIG. 10 are used as an example herein to describe values of the orientation information with examples.

When the mobile phone 200 turns to a left side along the y axis (a left long side of the mobile phone 200), an x-axis component in the orientation information is a negative value. When the mobile phone 200 turns to a right side along the y axis (a left long side of the mobile phone 200), an x-axis component in the orientation information is a positive value. The mobile phone 200 is placed with a camera 1002 of the mobile phone 200 at the top and an optical button 1003 of the mobile phone 200 at the bottom, to observe the mobile phone 200 from the right side of the mobile phone 200. When the mobile phone 200 turns clockwise, a y-axis component in the orientation information is a negative value. When the mobile phone 200 turns counterclockwise, a y-axis component in the orientation information is a positive value. Alternatively, when the mobile phone 200 turns clockwise, a y-axis component in the orientation information is a positive value. When the mobile phone 200 turns counterclockwise, a y-axis component in the orientation information is a negative value. This is not limited in this embodiment of the present invention.

In this embodiment of the present invention, x=0 and y=0 may be set in the orientation information of the mobile phone 200 when the mobile phone 200 shown in FIG. 10 is placed horizontally. Certainly, to better conform to a use habit of a user, x=0 and y=0 may also be set in the orientation information of the mobile phone 200 when the mobile phone 200 shown in FIG. 10 is placed at an angle with the horizontal (for example, a short side is parallel to the horizontal, and there is a 45-degree angle between a long side and the horizontal).

It can be understood that the orientation information in this application may not only include the x-axis component and the y-axis component in two dimensions, but also include a z-axis component of a z axis that is perpendicular to the x axis and the y axis. In other words, the orientation information in this application may include three-dimensional components (the x-axis component, the y-axis component, and the z-axis component). A manner in which the mask image is moved based on the three-dimensional orientation information is similar to the manner in which the mask image is moved based on the two-dimensional orientation information. Details are not described herein.

In the image processing method provided in this embodiment of the present invention, when the terminal adds the diffuse reflection effect for the diffuse reflection object in the first image, because the mask image may be moved dynamically based on the orientation information of the terminal, the terminal may obtain the image that includes the diffuse reflection object and the diffuse reflection effect and that is generated by superposing the first image and the mask image moved based on the orientation information. That is, a dynamic diffuse reflection effect may be added for the diffuse reflection object.

In addition, in this embodiment of the present invention, a plurality of illumination models do not need to be configured in the terminal during a process of adding the dynamic diffuse reflection effect for the diffuse reflection object. Instead, the pre-designed first image and the mask image moved based on the orientation information are superposed, and simple calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this embodiment of the present invention. In conclusion, according to this solution, a real-time diffuse reflection effect may be achieved with fewer computing resources.

Figure 11:
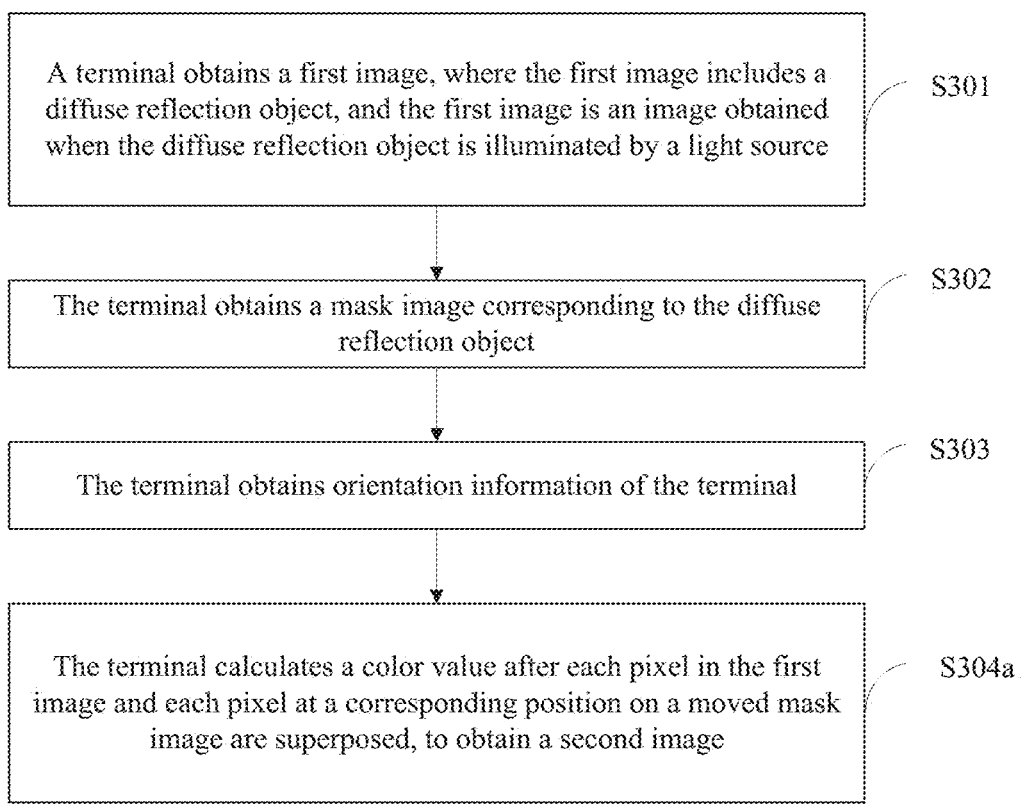
FIG. 11 is a flowchart 2 of an image processing method according to an embodiment of the present invention.

In an embodiment, as shown in FIG. 11. S304 shown in FIG. 3 may be replaced by S304*a*.

S304*a*: The terminal calculates a color value after each pixel in the first image and each pixel at a corresponding position on a moved mask image are superposed, to obtain a second image.

For example, the terminal may perform the following Sa for each pixel in the first image to obtain the second image. Sa is: calculating an after-superposition color value of a first pixel based on a color value of the first pixel and transparency of a pixel at a corresponding position on the moved mask image, where the first pixel is any pixel in the first image.

For example, the first image 501 and the mask image 601 that are shown in FIG. 8A and FIG. 8B are used as examples. The mask image 601 in FIG. 8B is the mask image moved based on the orientation information of the terminal. As shown in FIG. 8B, the pixel that is in the mask image and that is corresponding to the pixel b (a first pixel) in the first image 501 changes from the pixel a shown in FIG. 8A to the pixel c.

The pixel b is used as an example. The terminal may calculate an after-superposition color value RGB-b' of the pixel b in the first image 501 based on a color value RGB-b of the pixel b in the first image 501 and transparency (Transparency) T-c of the pixel c in the moved mask image (the mask image 601 shown in FIG. 8B).

For example, the terminal may use the following formula 1 to calculate the after-superposition color value RGB-b' of the pixel b in the first image 501:

$$RGB\text{-}b'=(RGB\text{-}b)*(T\text{-}c) \qquad \text{(Formula 1)}$$

In other words, the after-superposition color value RGB-b' of the pixel b may be a product of the color value RGB-b of the pixel b and the transparency T-c of the pixel c.

Further, to enhance authenticity of the second image, when the terminal generates the second image, reference may also be made to a third image obtained when no light source illuminates the diffuse reflection object. Specifically, before S304 shown in FIG. 3, the method in this embodiment of the present invention may further include S601.

S601: The terminal obtains a third image, where the third image includes a diffuse reflection object, and the third image is an image obtained when no light source illuminates the diffuse reflection object.

The third image may be an image stored in the terminal in advance, or the third image may be an image obtained by the terminal from another device, or the third image may be an image that is sent by another device and received by the terminal.

Figure 4:
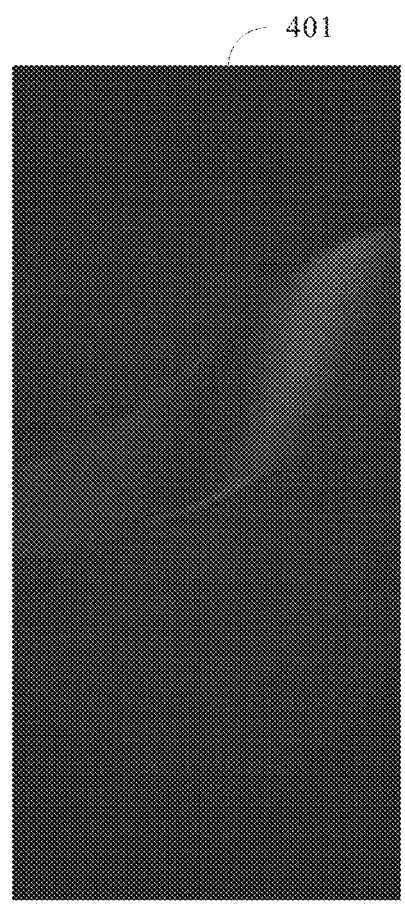
FIG. 4 is a schematic diagram of an example of an image including a diffuse reflection object according to an embodiment of the present invention.
Figure 5:
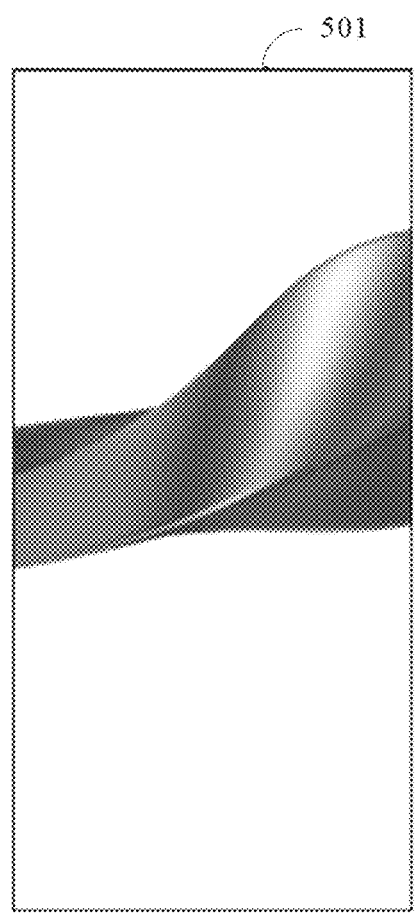
FIG. 5 is a schematic diagram of an example of a first image according to an embodiment of the present invention.

For example, the third image may be an image that includes the diffuse reflection object and that is drawn by the designer using image processing software (three-dimensional software, for example, 3 ds max), and then is stored in the terminal or transmitted to the terminal by using another device. For example, the third image may be the image 401 that is drawn by the designer in 3 ds max and that is shown in FIG. 4.

Correspondingly, the Sa may be replaced by Sb. In Sb, the terminal calculates the after-superposition color value of the first pixel based on the color value of the first pixel, a color value of a pixel at a corresponding position on the third image, and the transparency of the pixel at the corresponding position on the moved mask image.

Figure 12A:
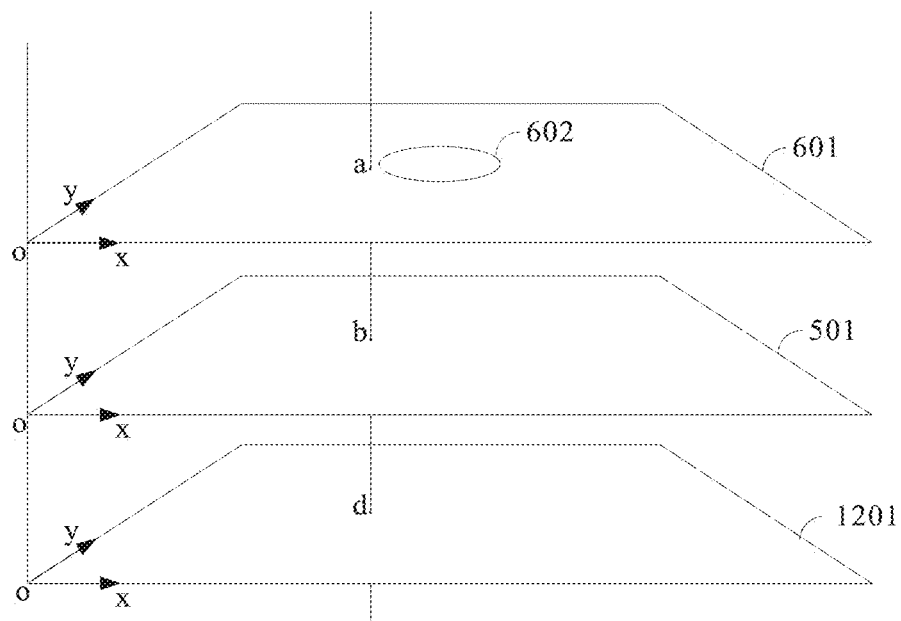
FIG. 12A and FIG. 12B are a schematic diagram of an example of superposing a first image, a third image, and a mask image according to an embodiment of the present invention.

For example, as shown in FIG. 12A, a first image 501, a mask image 601 corresponding to a diffuse reflection object in the first image, and a third image 1201 may be superposed. In addition, as shown in FIG. 12A, when the terminal does not make orientational movement (that is, the terminal does not move relatively to preset xy coordinate axes), the first image 501, the mask image 601, and the third image 1201 may be aligned with one another. For example, a pixel b in the first image 501 is corresponding to a pixel a in the mask image 601 and a pixel d in the third image 1201. When the terminal moves k (that is, orientation information of the terminal) to a negative half-axis of the x axis of the xy coordinate axes, as shown in FIG. 8B, the mask image 601 may also move k to the negative half-axis of the x axis of the xy coordinate axes based on the orientation information. In this case, the pixel b in the first image 501 and the pixel d in the third image 1201 may be corresponding to a pixel c in the mask image 601.

Figure 12B:
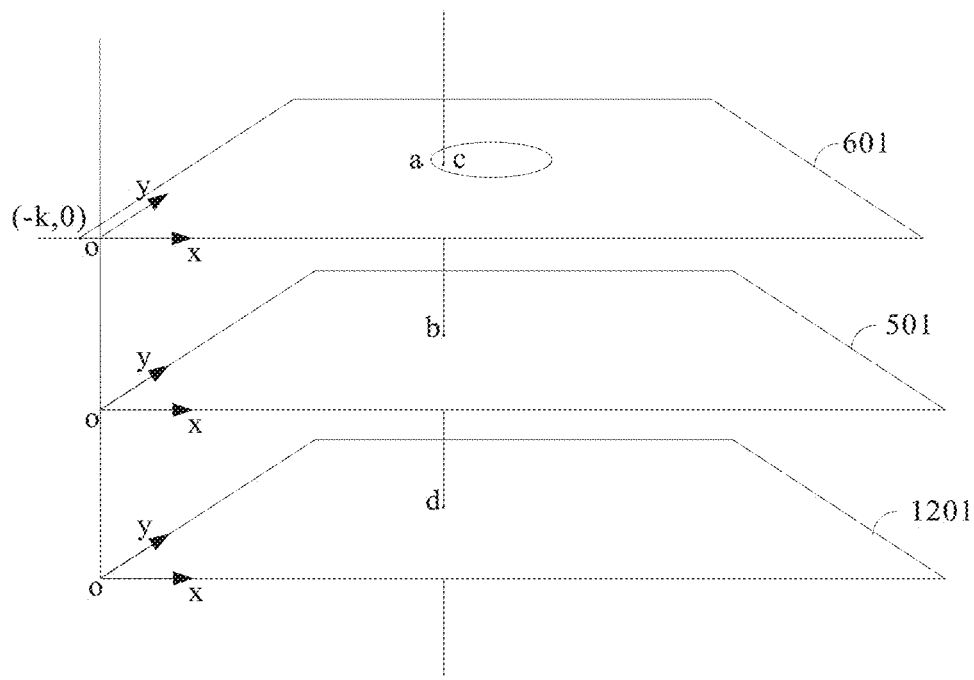

For example, the first image 501, the mask image 601, and the third image 1201 that are shown in FIG. 12A and FIG. 12B are used as examples. The mask image 601 in FIG. 12B is the mask image moved based on the orientation information of the terminal. As shown in FIG. 12B, the pixel that is in the mask image 601 and that is corresponding to the pixel b (a first pixel) in the first image 501 and the pixel d in the third image 1201 changes from the pixel a shown in FIG. 8A to the pixel c.

The pixel b is used as an example. The terminal may calculate an after-superposition color value RGB-b" of the pixel b in the first image 501 based on a color value RGB-b of the pixel b in the first image 501, a color value RGB-d of the pixel d in the third image 1201, and transparency (Transparency) T-c of the pixel c in the moved mask image (the mask image 601 shown in FIG. 8B).

For example, the terminal may use the following formula 2 to calculate the after-superposition color value RGB-b" of the pixel b in the first image 501:

$$RGB\text{-}b''=(RGB\text{-}d)*(1-(T\text{-}c))+(RGB\text{-}b)*(T\text{-}c) \qquad \text{(Formula 2)}$$

It should be noted that a method for calculating, by the terminal, the color value after each pixel in the first image and each pixel at the corresponding position on the moved mask image are superposed, to obtain the second image includes but is not limited to the method in the foregoing embodiment, and another calculation method is not described in this embodiment of the present invention.

Figure 13:
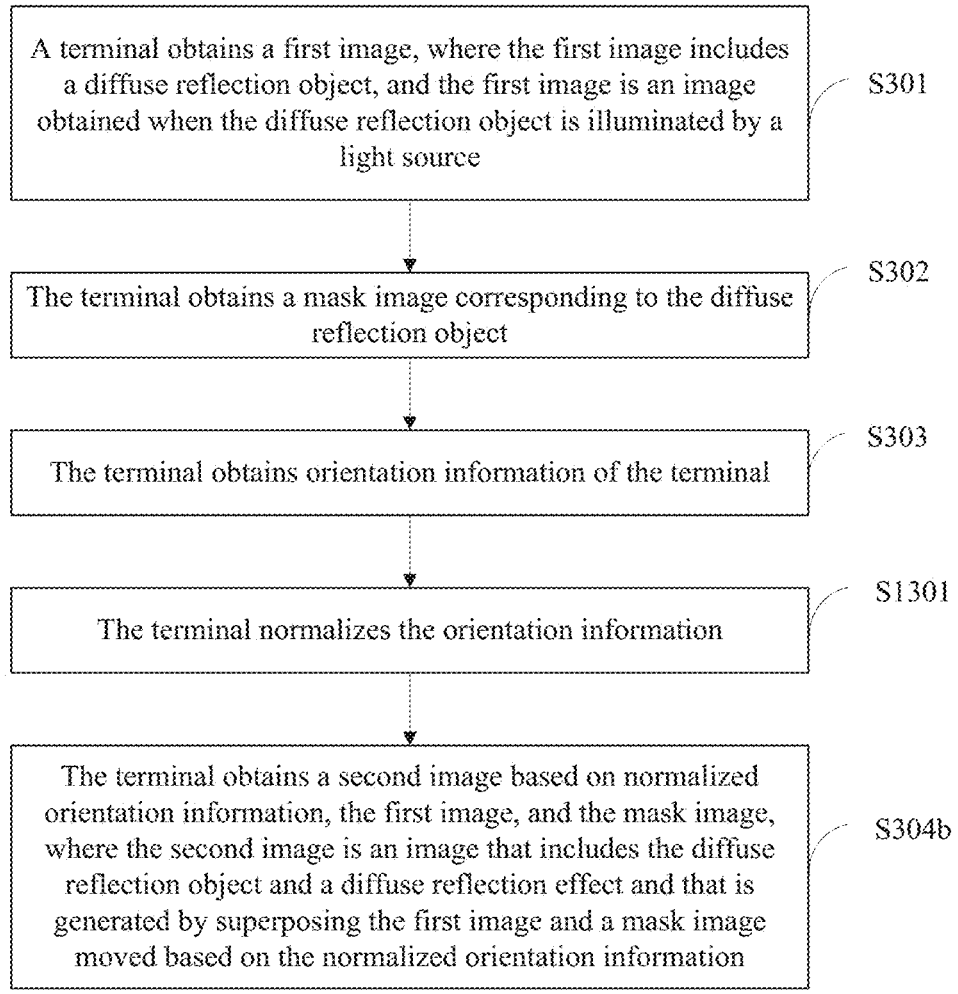
FIG. 13 is a flowchart 3 of an image processing method according to an embodiment of the present invention.

Further, to limit components (such as an x-axis component and a y-axis component) in the orientation information of the terminal to a specific range so as to facilitate subsequent data calculation or ensure faster convergence during program running, as shown in FIG. 13, the method in this embodiment of the present invention may further include S1301 after S303 shown in FIG. 3 and before S304 shown in FIG. 3.

S1301: The terminal normalizes the orientation information.

Normalizing the orientation information in this embodiment of the present invention means converting each component in the orientation information into a decimal in a range of (0, 1) based on a proportion.

For example, it is assumed that the orientation information includes an x-axis component and a y-axis component. In addition, x=5 millimeters (mm), y=6 mm, a value range of x and y is [−10, 10], and a unit is mm. Then, the terminal may normalize the x-axis component and the y-axis component to obtain, through calculation, normalized x'=x/10=0.5 and normalized y'=y/10=0.6.

Correspondingly, as shown in FIG. 13, the foregoing S304 may be replaced by S304b.

S304b: The terminal obtains a second image based on normalized orientation information, the first image, and the mask image, where the second image is an image that includes the diffuse reflection object and a diffuse reflection effect and that is generated by superposing the first image and the mask image moved based on the normalized orientation information.

According to the image processing method in this embodiment of the present invention, a plurality of illumination models do not need to be configured in the terminal when the terminal adds the dynamic diffuse reflection effect for the diffuse reflection object. Instead, the pre-designed first image and the mask image moved based on the orientation information are superposed, and simple calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this embodiment of the present invention. That is, according to this solution, a real-time diffuse reflection effect may be achieved with fewer computing resources.

Figure 14:
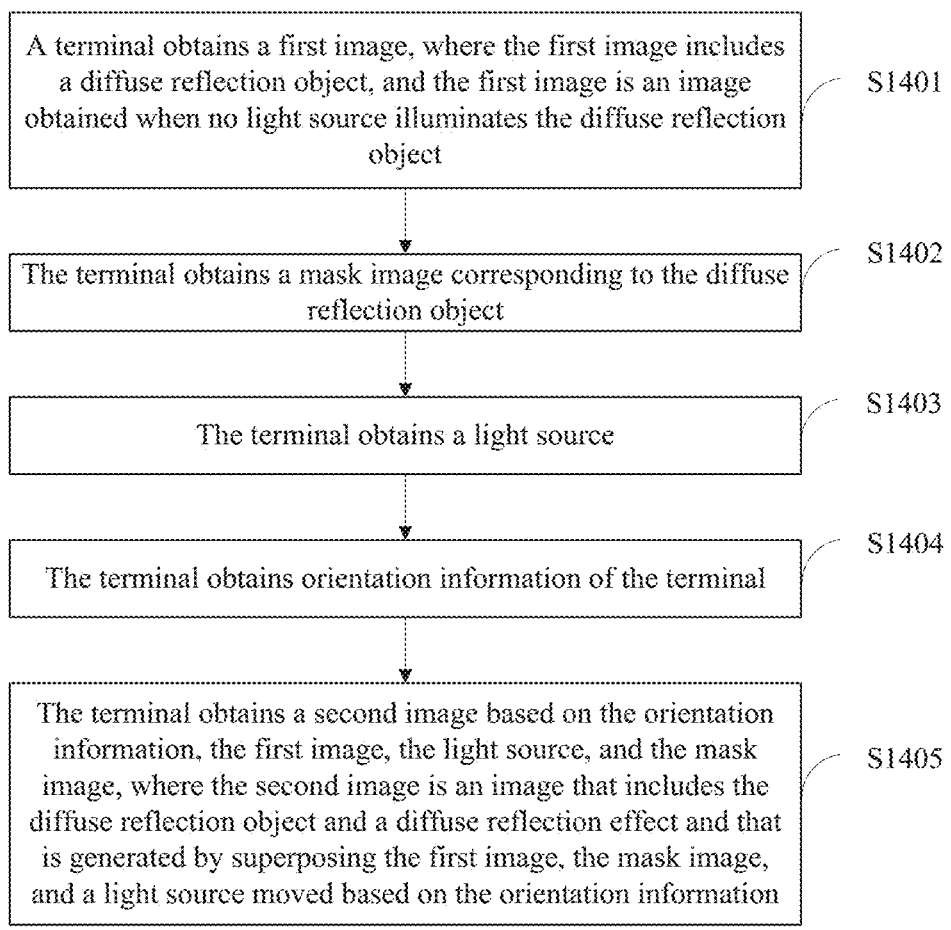
FIG. 14 is a flowchart 4 of an image processing method according to an embodiment of the present invention.

In another application scenario of the embodiments of the present invention, a dynamic diffuse reflection effect may be added for a diffuse reflection object by moving a light source. In this application scenario, as shown in FIG. 14, an image processing method provided in this embodiment of the present invention may include S1401 to S1405.

S1401: A terminal obtains a first image, where the first image includes a diffuse reflection object, and the first image is an image obtained when no light source illuminates the diffuse reflection object.

The first image is equivalent to the third image in the foregoing embodiment. For example, the first image may be an image 401 drawn by a designer in 3 ds max, as shown in FIG. 4.

S1402: The terminal obtains a mask image corresponding to the diffuse reflection object.

For a specific method for obtaining, by the terminal, the mask image corresponding to the diffuse reflection object, refer to detailed descriptions in the first application scenario of the embodiments of the present invention and detailed descriptions of the mask image. Details are not described herein again in this embodiment of the present invention.

S1403: The terminal obtains a light source.

For example, the light source in this embodiment of the present invention may be a light source image. The light source image may be designed by the designer for a different diffuse reflection object. For one diffuse reflection object, the designer may design one or more light source images corresponding to different diffuse reflection effects. Color values of different pixels in the light source image are different.

S1404: The terminal obtains orientation information of the terminal.

For a specific method for obtaining the orientation information of the terminal by the terminal, refer to detailed descriptions in the first application scenario of the embodiments of the present invention and detailed descriptions of the orientation information of the terminal. Details are not described herein again in this embodiment of the present invention.

S1405: The terminal obtains a second image based on the orientation information, the first image, the light source, and the mask image, where the second image is an image that includes the diffuse reflection object and a diffuse reflection effect and that is generated by superposing the first image, the mask image, and a light source moved based on the orientation information.

Figure 15:
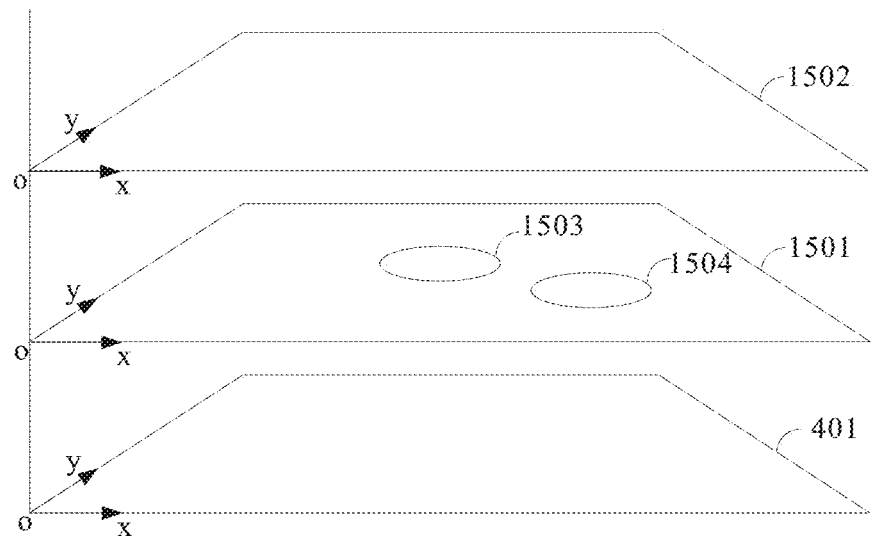
FIG. 15 is a schematic diagram 1 of an example of superposing a first image, a light source image, and a mask image according to an embodiment of the present invention.

For example, as shown in FIG. 15, a first image 401, a mask image 1501 corresponding to a diffuse reflection object in the first image, and a light source image 1502 may be superposed. The mask image 1501 may include a mask pattern 1503 and a mask pattern 1504.

Figure 16A:
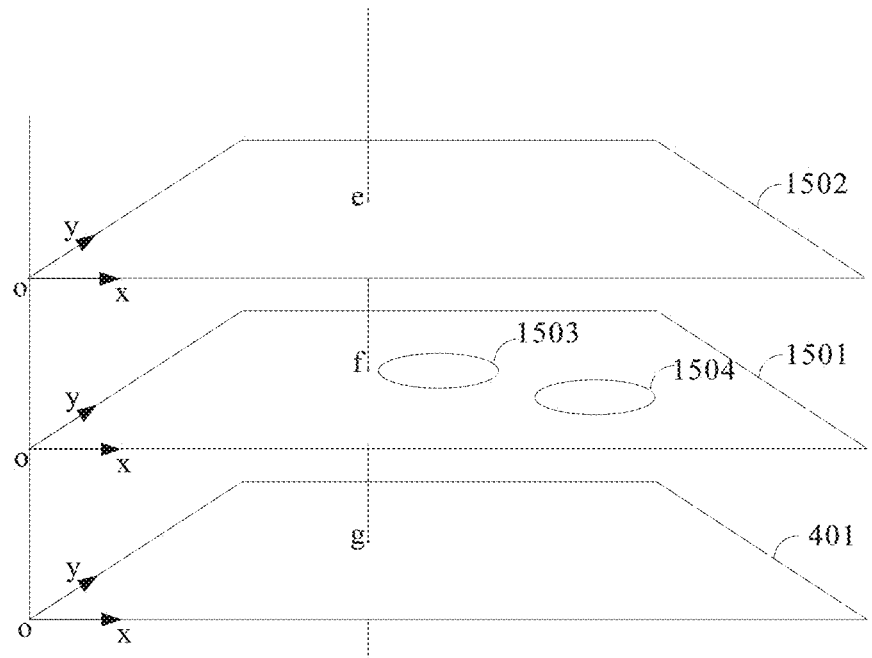
FIG. 16A and FIG. 16B are a schematic diagram 2 of an example of superposing a first image, a light source image, and a mask image according to an embodiment of the present invention.
Figure 16B:
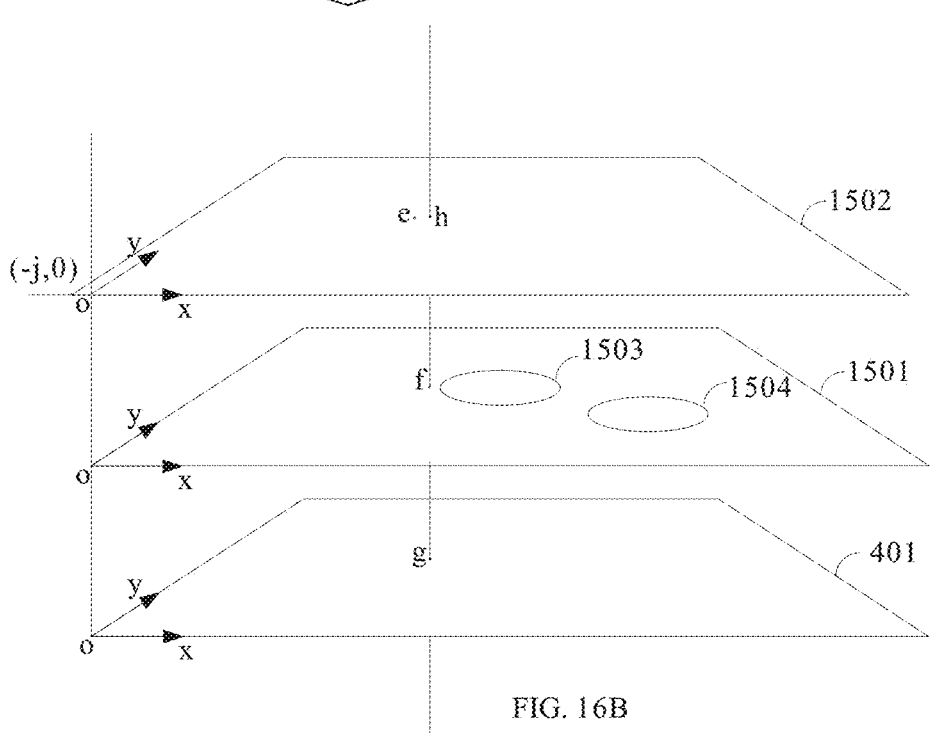

In addition, as shown in FIG. 16A, when the terminal does not make orientational movement (that is, the terminal does not move relatively to preset xy coordinate axes), the first image 401, the mask image 1501, and the light source image 1502 may be aligned with one another. For example, a pixel g in the first image 401 is corresponding to a pixel f in the mask image 1501 and a pixel e in the light source image 1502. When the terminal moves j (that is, orientation information of the terminal) to a negative half-axis of the x axis of the xy coordinate axes, as shown in FIG. 16B, the light source image 1502 may also move j to the negative half-axis of the x axis of the xy coordinate axes based on the orientation information. In this case, the pixel g in the first image 401 and the pixel f in the mask image 1501 are corresponding to a pixel h in the light source image 1502.

The color values of the different pixels in the light source image are different, for example, color values of the pixel e and the pixel h, color values of pixels in the first image are different, and transparency of pixels in the mask image is different. Different diffuse reflection effects may be achieved by superposing the different color values and the different transparency. In this case, a diffuse reflection effect produced by superposing the pixel e in the light source image 1502, the pixel g in the first image 401, and the pixel f in the mask image 1501 that are shown in FIG. 16A is different from a diffuse reflection effect produced by superposing the pixel h in the light source image 1502, the pixel g in the first image 401, and the pixel f in the mask image 1501 that are shown in FIG. 16B.

For a manner of configuring the coordinate axes for the terminal in the second application scenario of the embodiments of the present invention, refer to detailed descriptions in the first application scenario. Details are not described herein again in this embodiment of the present invention.

In the image processing method provided in this embodiment of the present invention, when the terminal adds the diffuse reflection effect for the diffuse reflection object in the first image, because the light source may be moved dynamically based on the orientation information of the terminal, the terminal may obtain the image that includes the diffuse reflection object and the diffuse reflection effect and that is generated by superposing the first image, the mask image, and the light source moved based on the orientation information. That is, a dynamic diffuse reflection effect may be added for the diffuse reflection object.

In addition, in this embodiment of the present invention, a plurality of illumination models do not need to be configured in the terminal during a process of adding the dynamic diffuse reflection effect for the diffuse reflection object. Instead, the pre-designed first image, the mask image, and the light source (image) moved based on the orientation information are superposed, and simple superposition calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this embodiment of the present invention. In conclusion, according to this solution, a real-time diffuse reflection effect may be achieved with fewer computing resources.

Figure 17:
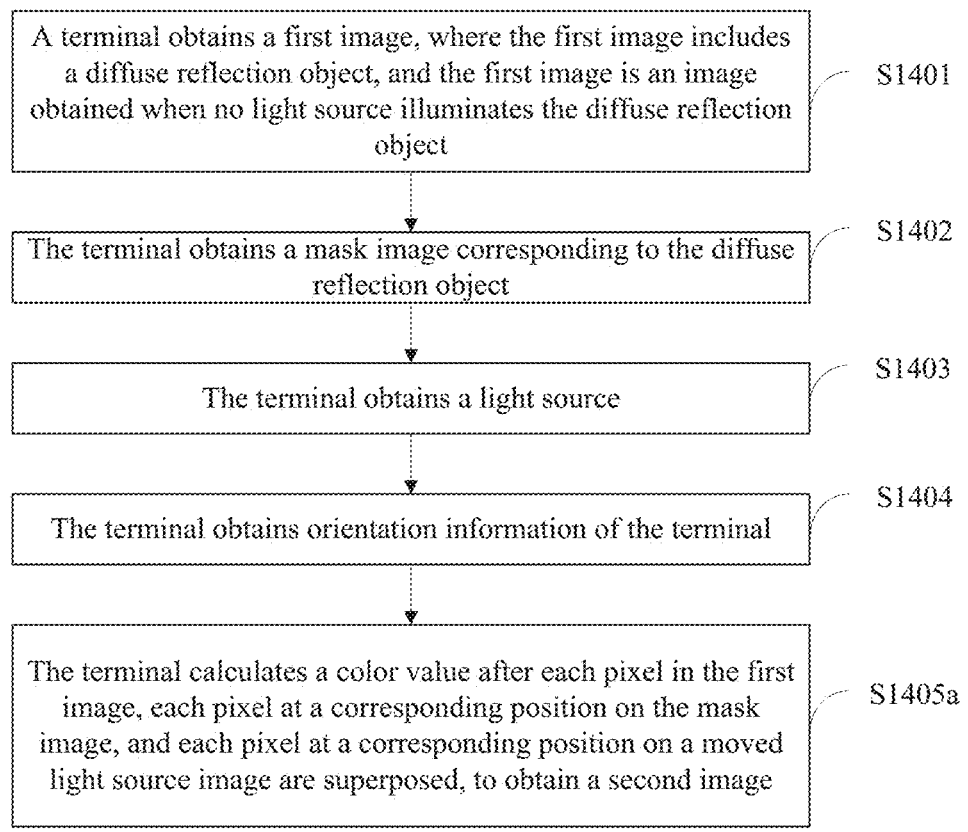
FIG. 17 is a flowchart 5 of an image processing method according to an embodiment of the present invention.

In an embodiment, as shown in FIG. 17, S1405 shown in FIG. 14 may be replaced by S1405a.

S1405a: The terminal calculates a color value after each pixel in the first image, each pixel at a corresponding position on the mask image, and each pixel at a corresponding position on a moved light source image are superposed, to obtain a second image.

For example, the terminal may perform the following Sc for each pixel in the first image to obtain the second image. Sc is: calculating an after-superposition color value of a first pixel based on a color value of the first pixel, transparency of a pixel at a corresponding position on the mask image, and a color value of a pixel at a corresponding position on the moved light source image, where the first pixel is any pixel in the first image.

For example, the first image 401, the light source image 1502, and the mask image 1501 that are shown in FIG. 16A and FIG. 16B are used as examples. The light source image 1502 in FIG. 16B is the light source image moved based on the orientation information of the terminal. As shown in FIG. 16B, the pixel that is in the light source image 1502 and that is corresponding to the pixel g (a first pixel) in the first image 401 changes from the pixel e shown in FIG. 16A to the pixel h.

The pixel g is used as an example. The terminal may calculate an after-superposition color value RGB-g' of the pixel g in the first image 401 based on a color value RGB-g of the pixel g in the first image 401, transparency T-f of the pixel f in the mask image 1501, and a color value RGB-h of the pixel h in the moved light source image.

For example, the terminal may use the following formula 3 to calculate the after-superposition color value RGB-b' of the pixel b in the first image 501:

$$RGB\text{-}g' = (RGB\text{-}g) + (RGB\text{-}h) * (T\text{-}f) \qquad \text{(Formula 3)}$$

In other words, the after-superposition color value RGB-f of the pixel g may be the color value RGB-b of the pixel g plus a product of the color value RGB-h of the pixel h and the transparency T-f of the pixel f.

Figure 18:
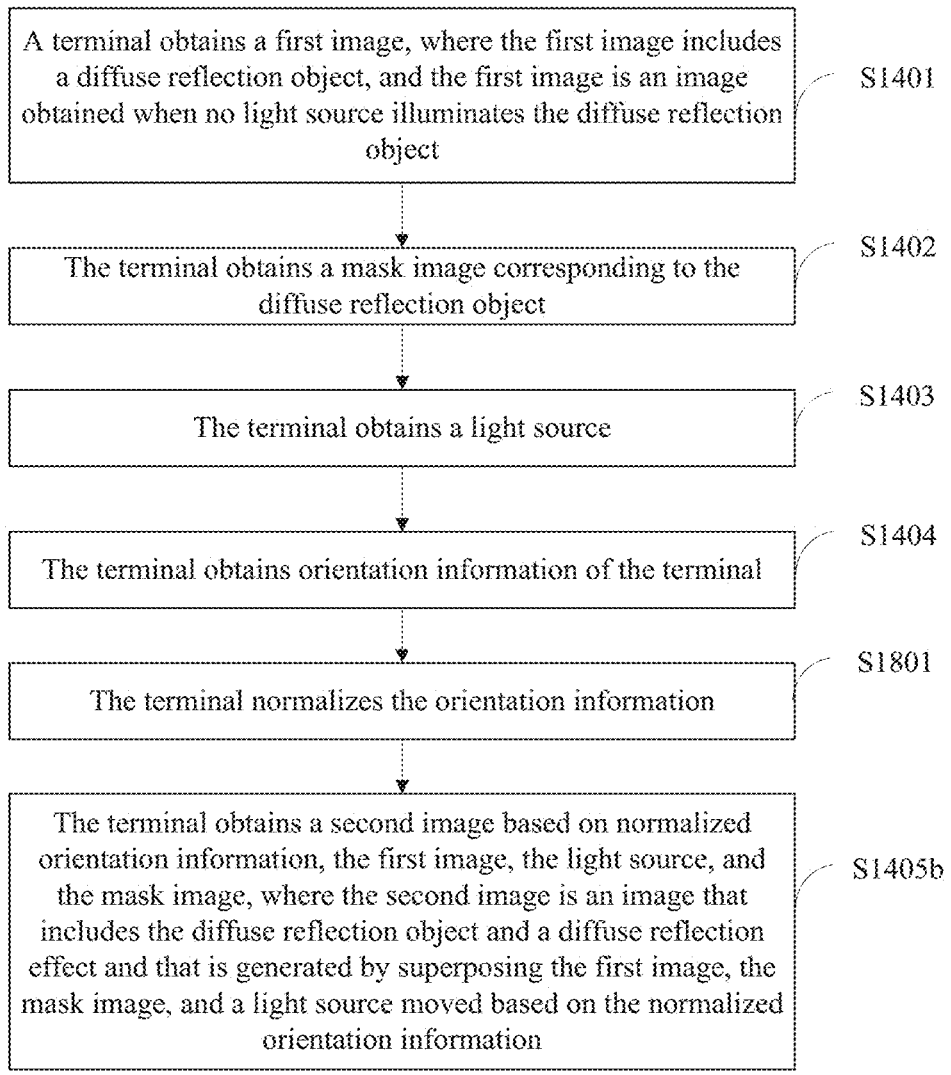
FIG. 18 is a flowchart 6 of an image processing method according to an embodiment of the present invention.

Further, to limit components (such as an x-axis component and a y-axis component) in the orientation information of the terminal to a specific range so as to facilitate subsequent data calculation or ensure faster convergence during program running, as shown in FIG. 18, the method in this embodiment of the present invention may further include S1801 after S1404 shown in FIG. 14 and before S1405 shown in FIG. 14.

S1801: The terminal normalizes the orientation information.

For orientation information normalization performed by the terminal, refer to detailed descriptions in the first application scenario of the embodiments of the present invention. Details are not described herein again in this embodiment of the present invention.

Correspondingly, as shown in FIG. 18, the foregoing S1405 may be replaced by S1405b.

S1405b: The terminal obtains a second image based on normalized orientation information, the first image, the light source, and the mask image, where the second image is an image that includes the diffuse reflection object and a diffuse reflection effect and that is generated by superposing the first image, the mask image, and a light source moved based on the normalized orientation information.

According to the image processing method in this embodiment of the present invention, a plurality of illumination models do not need to be configured in the terminal when the terminal adds the dynamic diffuse reflection effect for the diffuse reflection object. Instead, the pre-designed first image, the mask image, and the light source moved based on the orientation information are superposed, and simple calculation is performed. Then, the second image including the diffuse reflection object and the diffuse reflection effect may be obtained. In this way, a calculation volume required for adding the diffuse reflection effect may be reduced. Even an embedded terminal with a limited computing capability may also add a dynamic diffuse reflection effect for a diffuse reflection object by using the method provided in this embodiment of the present invention. That is, according to this solution, a real-time diffuse reflection effect may be achieved with fewer computing resources.

Further, in another application scenario of the embodiments of the present invention, a dynamic diffuse reflection effect may be added for a diffuse reflection object by moving an image that includes the diffuse reflection object (for example, the first image in any of the foregoing application scenarios).

In an implementation of this application scenario, the image processing method may include: obtaining, by the terminal, a first image, where the first image includes a diffuse reflection object, and the first image is an image obtained when the diffuse reflection object is illuminated by a light source; obtaining, by the terminal, a mask image corresponding to the diffuse reflection object: obtaining, by the terminal, orientation information of the terminal; and obtaining, by the terminal, a second image based on the orientation information, the first image, and the mask image, where the second image is an image that includes the diffuse reflection object and a diffuse reflection effect and that is generated by superposing the mask image and a first image moved based on the orientation information.

Optionally, in this implementation, the terminal may further superpose the mask image, the light source, and the first image moved based on the orientation information, to obtain the second image that is an image including the diffuse reflection object and the diffuse reflection effect. The light source may be a light source image. For the light source and the light source image, refer to detailed descriptions of corresponding content in the first application scenario. Details are not described herein again in this embodiment of the present invention.

In another implementation of this application scenario, the image processing method may include: obtaining, by the terminal, a first image, where the first image includes a diffuse reflection object, and the first image is an image obtained when no light source illuminates the diffuse reflection object: obtaining, by the terminal, a mask image corresponding to the diffuse reflection object; obtaining, by the terminal, a light source; obtaining, by the terminal, orientation information of the terminal; and obtaining, by the terminal, a second image based on the orientation information, the first image, the light source, and the mask image, where the second image is an image that includes the diffuse reflection object and a diffuse reflection effect and that is generated by superposing the mask image, the light source, and a first image moved based on the orientation information.

For detailed descriptions of the method steps of the image processing method provided in this application scenario of this embodiment of the present invention, refer to detailed descriptions of corresponding content in any of the foregoing application scenarios. Details are not described herein again in this embodiment of the present invention.

The foregoing describes the solutions provided in the embodiments of this application mainly from a perspective of an image processing process of the terminal. It may be understood that, to implement the foregoing functions, the terminal includes a corresponding function module for performing each of the functions. A person skilled in the art should be easily aware that terminals and algorithm steps in the examples described with reference to the embodiments disclosed in this specification may be implemented in a form of hardware or in a form of a combination of hardware and computer software in this application. Whether the functions are performed by hardware or computer software driving hardware depends on particular applications and design constraints of the technical solutions. A person skilled in the art may use different methods to implement the described functions for each particular application, but it should not be considered that the implementation goes beyond the scope of this application.

An embodiment of this application provides a terminal to implement the foregoing method embodiments. Specifically, the terminal may be divided based on the foregoing method examples. For example, each module or unit may be divided based on each function, or two or more functions may be integrated into one processing module. The integrated module may be implemented in a form of hardware, or may be implemented in a form of a software module or a unit. The module or unit division in the embodiments of this application is an example, and is merely logical function division. There may be another division manner in an actual implementation.

Figure 19:
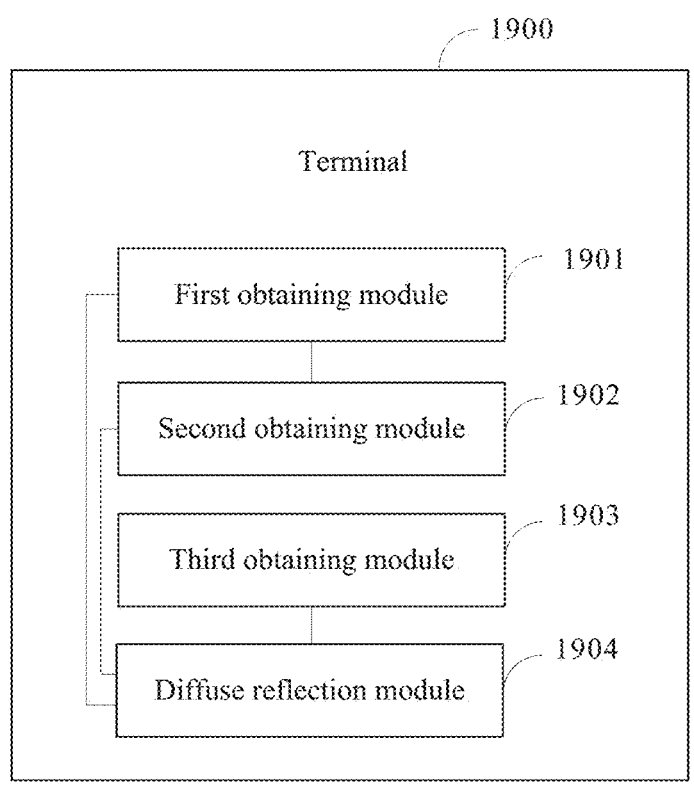
FIG. 19 is a schematic structural diagram 1 of a terminal according to an embodiment of the present invention.

FIG. 19 is a possible schematic structural diagram of a terminal used in the foregoing embodiments. In the first application scenario of the embodiments of the present invention, as shown in FIG. 19, a terminal 1900 may include: a first obtaining module 1901, a second obtaining module 1902, a third obtaining module 1903, and a diffuse reflection module 1904.

In the first application scenario of the embodiments of the present invention, the first obtaining module 1901 is configured to support S301 in the method embodiments, and/or is used in another process of the technology described in this specification. The second obtaining module 1902 is configured to support S302 in the method embodiments, and/or is used in another process of the technology described in this specification. The third obtaining module 1903 is configured to support S303 in the method embodiments, and/or is used in another process of the technology described in this specification. The diffuse reflection module 1904 is configured to support S304, S304a, S304b, Sa, and Sb in the method embodiments, and/or is used in another process of the technology described in this specification.

Figure 20:
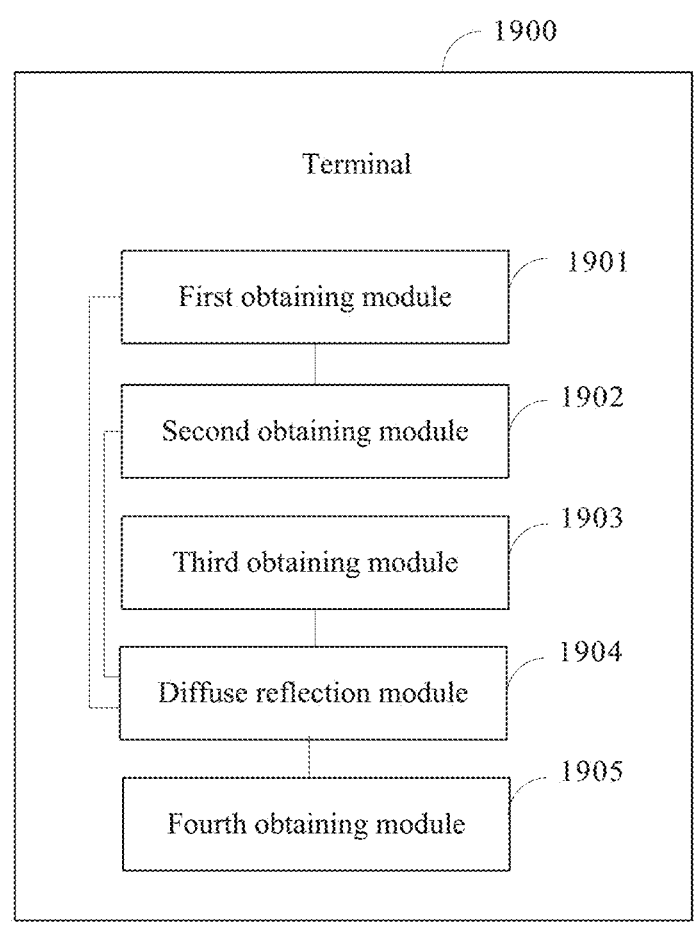
FIG. 20 is a schematic structural diagram 2 of a terminal according to an embodiment of the present invention.

Further, in the first application scenario of the embodiments of the present invention, as shown in FIG. 20, the terminal 1900 may further include: a fourth obtaining module 1905. The fourth obtaining module 1905 is configured to support S601 in the method embodiments, and/or is used in another process of the technology described in this specification.

Figure 21:
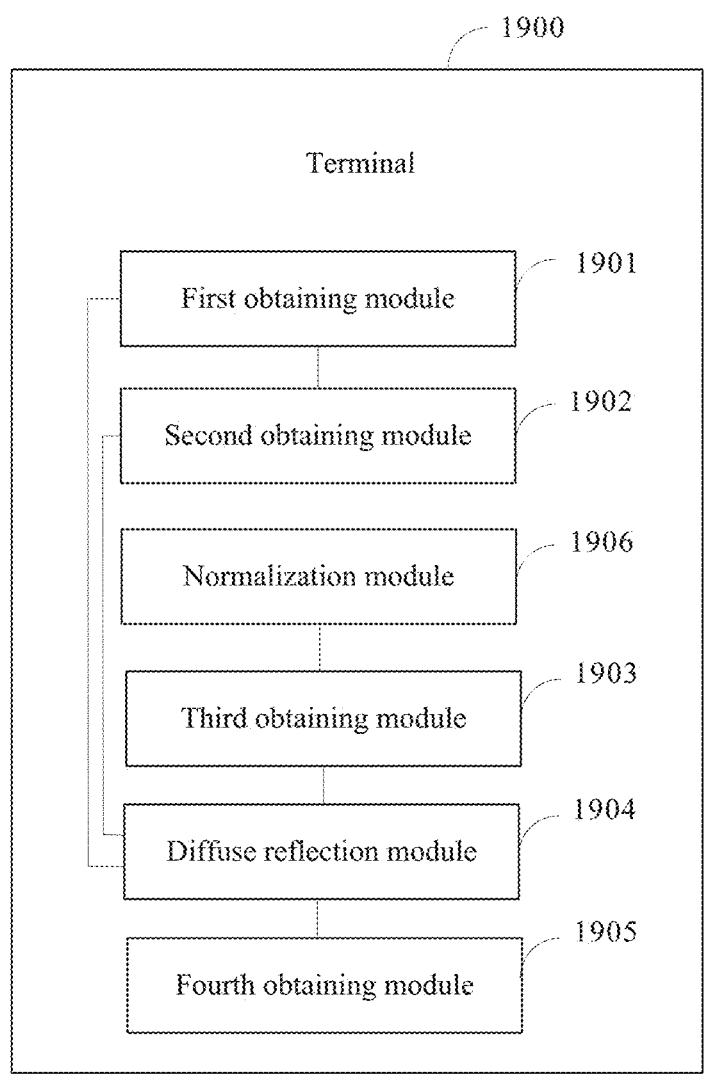
FIG. 21 is a schematic structural diagram 3 of a terminal according to an embodiment of the present invention.

Further, in the first application scenario of the embodiments of the present invention, as shown in FIG. 21, the terminal 1900 may further include: a normalization module 1906. The normalization module 1906 is configured to support S1301 in the method embodiments, and/or is used in another process of the technology described in this specification.

FIG. 20 is a possible schematic structural diagram of a terminal used in the foregoing embodiments. In the second application scenario of the embodiments of the present invention, as shown in FIG. 20, a terminal 1900 may include: a first obtaining module 1901, a second obtaining module 1902, a third obtaining module 1903, a fourth obtaining module 1905, and a diffuse reflection module 1904.

In the second application scenario of the embodiments of the present invention, the first obtaining module 1901 is configured to support S1401 in the method embodiments, and/or is used in another process of the technology described in this specification. The second obtaining module 1902 is configured to support S1402 in the method embodiments, and/or is used in another process of the technology described in this specification. The third obtaining module 1903 is configured to support S1403 in the method embodiments, and/or is used in another process of the technology described in this specification. The fourth obtaining module 1905 is configured to support S1404 in the method embodiments, and/or is used in another process of the technology described in this specification. The diffuse reflection module 1904 is configured to support S1405, S1405a, S1405b, and Sc in the method embodiments, and/or is used in another process of the technology described in this specification.

Further, in the second application scenario of the embodiments of the present invention, as shown in FIG. 21, the terminal 1900 may further include: a normalization module 1906. The normalization module 1906 is configured to support S1801 in the method embodiments, and/or is used in another process of the technology described in this specification.

Further, the terminal 1900 may further include: a storage module. The storage module is configured to store a first image, a third image, and the like, and/or is used in another process of the technology described in this specification.

Certainly, the terminal 1900 includes but is not limited to the foregoing listed unit modules. For example, the terminal 1900 may further include a sending module configured to send data or a signal to another device, a receiving module configured to receive data or a signal sent by another device, and the like. Moreover, functions that can be specifically implemented by the foregoing modules also include but are not limited to functions corresponding to the method steps described in the foregoing embodiments. For another unit of the terminal 1900 and detailed descriptions of various units of the terminal 1900, refer to detailed descriptions of the method steps corresponding to the units. Details are not described herein again in this embodiment of this application.

If an integrated unit is used, the first obtaining module 1901, the second obtaining module 1902, the third obtaining module 1903, the diffuse reflection module 1904, and the like may be integrated into one processing unit for implementation. The processing unit may be a processor or a controller, for example, may be a CPU, a graphics processing unit (Graphics Processing Unit, GPU), a general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or any combination thereof. It may implement or execute various example logical blocks, modules, and circuits that are described with reference to the content disclosed in this application. The processing unit may also be a combination of computing functions, for example, a combination of one or more microprocessors or a combination of a DSP and a microprocessor. The storage module may be a memory.

Figure 22:
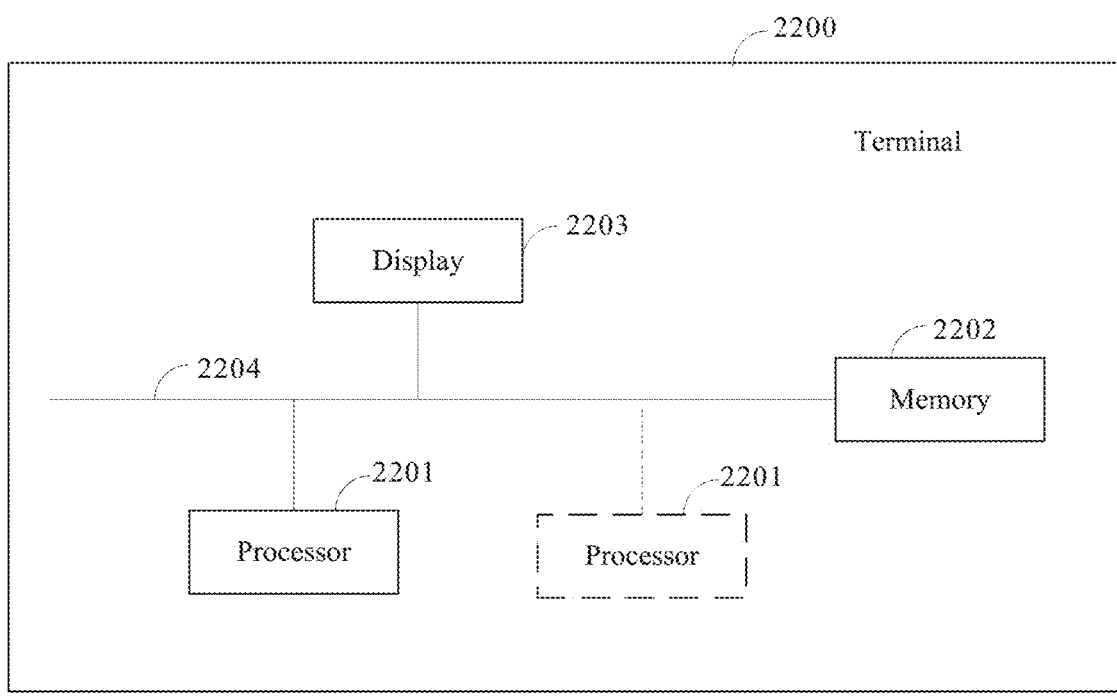
FIG. 22 is a schematic structural diagram 4 of a terminal according to an embodiment of the present invention.

When the processing unit is a processor and the storage module is a memory, the terminal 1900 in this embodiment of this application may be a terminal 2200 shown in FIG. 22. As shown in FIG. 22, the terminal 2200 includes: a memory 2202, a display 2203, and one or more processors 2201. The one or more processors 2201, the memory 2202, and the display 2203 are connected to each other by using a bus 2204. The display 2203 is configured to display an image generated by the one or more processors 2201.

The memory 2202 is configured to store computer program code, where the computer program code includes an instruction. When the one or more processors 2201 of the terminal 2200 execute the instruction, the terminal 2200 performs related method steps in any one of FIG. 3, FIG. 11. FIG. 13, FIG. 14, FIG. 17, and FIG. 18 to implement the image processing methods in the foregoing embodiments.

The bus 2204 may be a peripheral component interconnect (Peripheral Component Interconnect, PCI) bus, an extended industry standard architecture (Extended Industry Standard Architecture, EISA) bus, or the like. The bus 2204 may be categorized as an address bus, a data bus, a control bus, or the like. For ease of indication, the bus is indicated by using only one bold line in FIG. 22. However, it does not indicate that there is only one bus or only one type of bus.

Figure 23:
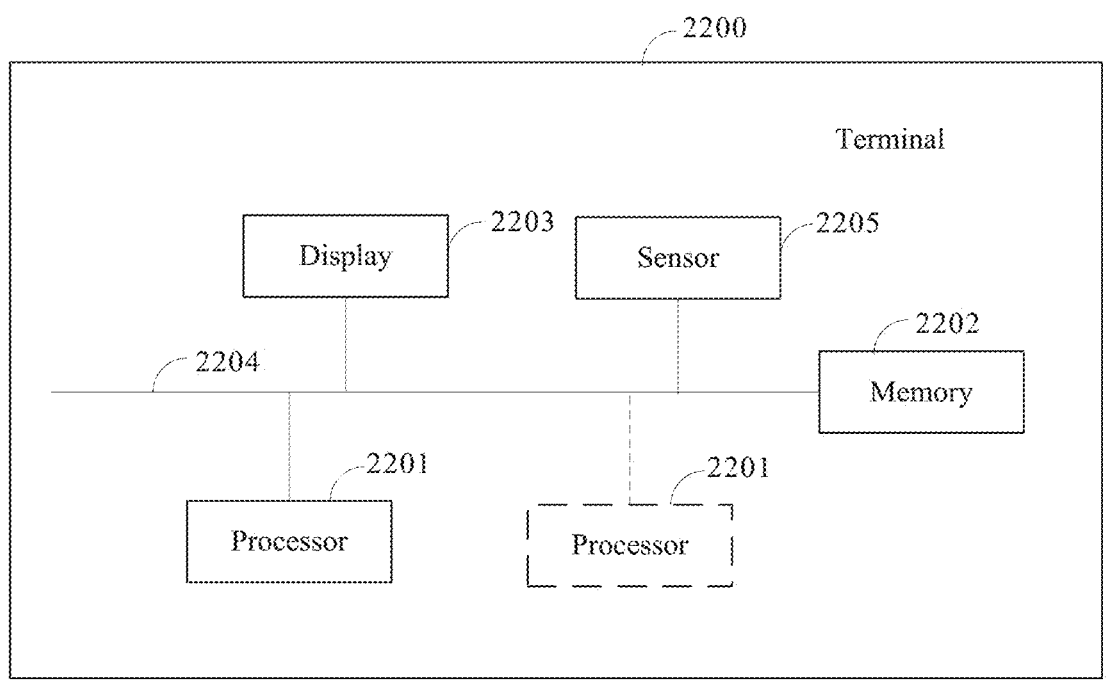
FIG. 23 is a schematic structural diagram 5 of a terminal according to an embodiment of the present invention.

Further, as shown in FIG. 23, the terminal may further include a sensor 2205. The sensor 2205 may be a motion sensor, for example, an orientation sensor. The sensor 2205 is configured to collect orientation information of the terminal 2200.

An embodiment of the present invention further provides a computer storage medium. The computer storage medium stores computer program code. When one or more processors 2201 of a terminal 2200 execute the computer program code, the terminal 2200 performs related method steps in any one of FIG. 3. FIG. 11, FIG. 13, FIG. 14, FIG. 17, and FIG. 18 to implement the image processing methods in the foregoing embodiments.

An embodiment of the present invention further provides a computer program product. When the computer program product runs on a computer, the computer is enabled to perform related method steps in any one of FIG. 3, FIG. 11, FIG. 13, FIG. 14. FIG. 17, and FIG. 18 to implement the image processing methods in the foregoing embodiments.

The terminal 1900, the terminal 2200, the computer store medium, or the computer program product provided in the embodiments of the present invention is configured to perform the corresponding method provided above. Therefore, for beneficial effects that can be achieved, refer to beneficial effects in the corresponding method provided above. Details are not described herein again.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments. Details are not described herein.

In the several embodiments provided in this application, it should be understood that the disclosed system, apparatus, and method may be implemented in other manners. For example, the described apparatus embodiment is only an example. For example, the module or unit division is only logical function division, and there may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method applied to a terminal, the image processing method comprising:

obtaining a first pixelated image when a diffuse reflection object of the first pixelated image is illuminated by a light source;

obtaining a pixelated mask image corresponding to the diffuse reflection object;

obtaining orientation information of the terminal;

moving the pixelated mask image based on the orientation information to obtain a moved pixelated masked image;

generating a second pixelated image, wherein the second pixelated image comprises the diffuse reflection object and a diffuse reflection effect, by:
  superposing the first pixelated image and the moved pixelated mask image;
  calculating a color value obtained after superposing each pixel in the first pixelated image and each pixel at a corresponding position on the moved pixelated mask image;
  calculating an after-superposition color value for a first pixel based on a color value of the first pixel and transparency of a pixel at a corresponding position on the moved pixelated mask image, wherein the first pixel is any pixel in the first pixelated image;
  calculating the after-superposition color value for each pixel in the first pixelated image; and before generating the second pixelated image:
  obtaining a third pixelated image comprising a diffuse reflection object obtained when no light source illuminates the diffuse reflection object; and
  calculating the after-superposition color value for the first pixel based on the color value of the first pixel, a color value of a pixel at a corresponding position on the third pixelated image, and the transparency of the pixel at the corresponding position on the moved pixelated mask image.

2. The image processing method of claim 1, further comprising displaying the second pixelated image.

3. The image processing method of claim 1, wherein before generating the second pixelated image, the image processing method further comprises:
  normalizing the orientation information; and
  moving the pixelated mask image based on normalized orientation information.

4. The image processing method of claim 1, further comprising:
  obtaining a light source; and
  generating the second pixelated image by superposing the first pixelated image and the pixelated mask image, wherein the light source is moved based on the orientation information.

5. The image processing method of claim 4, wherein the light source comprises a pixelated light source image, and wherein the image processing method further comprises calculating a color value after each pixel in the first pixelated image, each pixel at a corresponding position on the pixelated mask image, and each pixel at a corresponding position on a moved pixelated light source image are superposed, to generate the second pixelated image.

6. The image processing method of claim 5, further comprising:
  calculating an after-superposition color value for a first pixel based on a color value of the first pixel, transparency of a pixel at a corresponding position on the pixelated mask image, and a color value of a pixel at a corresponding position on the moved pixelated light source image, wherein the first pixel is any pixel in the first pixelated image; and calculating the after-superposition color value for each pixel in the first pixelated image to generate the second pixelated image.

7. The image processing method of claim 4, wherein before generating the second pixelated image, the image processing method further comprises:
normalizing the orientation information; and
moving the light source based on normalized orientation information.

8. A terminal, comprising:
a memory coupled to the display and configured to store computer program code comprising computer instructions;
a processor coupled to the display and the memory, wherein the computer instructions that, when executed by the processor, cause the terminal to:
 obtain a first pixelated image, wherein the first pixelated image comprises a diffuse reflection object, and wherein the first pixelated image is obtained when the diffuse reflection object is illuminated by a light source;
 obtain a pixelated mask image corresponding to the diffuse reflection object;
 obtain orientation information of the terminal;
 move the pixelated mask image based on the orientation information of the terminal to obtain a moved pixelated masked image;
 generate a second pixelated image, wherein the second pixelated image comprises the diffuse reflection object and a diffuse reflection effect, by:
  superposing the first pixelated image and the moved pixelated mask image;
  calculating a color value obtained after each pixel in the first pixelated image and each pixel at a corresponding position on the moved pixelated mask image are superposed;
  calculating an after-superposition color value for a first pixel based on a color value of the first pixel and transparency of a pixel at a corresponding position on the moved pixelated mask image, wherein the first pixel is any pixel in the first pixelated image; and
  calculating the after-superposition color value for each pixel in the first pixelated image;
 obtain a third pixelated image, wherein the third pixelated image comprises a diffuse reflection object, and wherein the third pixelated image is obtained when no light source illuminates the diffuse reflection object;
 calculate the after-superposition color value for the first pixel based on the color value of the first pixel, a color value of a pixel at a corresponding position on the third pixelated image, and the transparency of the pixel at the corresponding position on the moved pixelated mask image; and
 display the second pixelated image.

9. The terminal of claim 8, wherein before generating the second pixelated image, the computer instructions, when executed by the processor, further cause the terminal to:
normalize the orientation information; and
move the pixelated mask image based on normalized orientation information.

10. The terminal of claim 8, wherein the computer instructions, when executed by the processor, further cause the terminal to:
obtain a light source; and
generate the second pixelated image by superposing the first pixelated image, the pixelated mask image and the light source based on the orientation information, the first pixelated image, the light source, and the pixelated mask image, wherein the light source is moved based on the orientation information.

11. The terminal of claim 10, wherein the light source comprises a pixelated light source image, and wherein the computer instructions, when executed by the processor, further cause the terminal to calculate a color value after each pixel in the first pixelated image, each pixel at a corresponding position on the pixelated mask image, and each pixel at a corresponding position on a moved pixelated light source image are superposed to generate the second pixelated image.

12. The terminal of claim 11, wherein the computer instructions, when executed by the processor, further cause the terminal to:
calculate an after-superposition color value for a first pixel based on a color value of the first pixel, transparency of a pixel at a corresponding position on the pixelated mask image, and a color value of a pixel at a corresponding position on the moved pixelated light source image, wherein the first pixel is any pixel in the first pixelated image; and
calculate the after-superposition color value for each pixel in the first pixelated image to generate the second pixelated image.

13. The terminal of claim 10, wherein before obtaining the second pixelated image based on the orientation information, the first pixelated image, the light source, and the pixelated mask image, the computer instructions, when executed by the processor, further cause the terminal to:
normalize the orientation information; and
move the light source based on normalized orientation information.

14. The terminal of claim 8, wherein the computer instructions, when executed by the processor, further cause the terminal to display the second pixelated image in real-time.

15. A computer program product comprising computer-executable instructions stored on a non-transitory computer-readable medium that, when executed by a processor, cause a terminal to:
obtain a first pixelated image, wherein the first pixelated image comprises a diffuse reflection object, and wherein the first pixelated image is obtained when the diffuse reflection object is illuminated by a light source;
obtain a pixelated mask image corresponding to the diffuse reflection object;
obtain orientation information of the terminal;
move the pixelated mask image based on the orientation information of the terminal to obtain a moved pixelated masked image;
generate a second pixelated image, wherein the second pixelated image comprises the diffuse reflection object and a diffuse reflection effect, by:
 superposing the first pixelated image and the moved pixelated mask image;
 calculating a color value obtained after each pixel in the first pixelated image and each pixel at a corresponding position on the moved pixelated mask image are superposed;
 calculating an after-superposition color value for a first pixel based on a color value of the first pixel and transparency of a pixel at a corresponding position on the moved pixelated mask image, wherein the first pixel is any pixel in the first pixelated image; and calculating the after-superposition color value for each pixel in the first pixelated image;

obtain a third pixelated image, wherein the third pixelated image comprises a diffuse reflection object, and wherein the third pixelated image is obtained when no light source illuminates the diffuse reflection object;

calculate the after-superposition color value for the first pixel based on the color value of the first pixel, a color value of a pixel at a corresponding position on the third pixelated image, and the transparency of the pixel at the corresponding position on the moved pixelated mask image; and display the second pixelated image.

16. The computer program product of claim 15, wherein the computer executable instructions further cause the terminal to:

normalize the orientation information; and move the pixelated mask image based on normalized orientation information.

17. The computer program product of claim 15, wherein the computer executable instructions further cause the terminal to:

obtain a light source; and generate the second pixelated image by superposing the first pixelated image, the pixelated mask image and the light source based on the orientation information, the first pixelated image, the light source, and the pixelated mask image, wherein the light source is moved based on the orientation information.

18. The computer program product of claim 17, wherein the light source comprises a pixelated light source image, and wherein the computer instructions, when executed by the processor, further cause the terminal to calculate a color value after each pixel in the first pixelated image, each pixel at a corresponding position on the pixelated mask image, and each pixel at a corresponding position on a moved pixelated light source image are superposed to generate the second pixelated image.

19. The computer program product of claim 18, wherein the computer executable instructions further cause the terminal to:

calculate an after-superposition color value for a first pixel based on a color value of the first pixel, transparency of a pixel at a corresponding position on the pixelated mask image, and a color value of a pixel at a corresponding position on the moved pixelated light source image, wherein the first pixel is any pixel in the first pixelated image; and calculate the after-superposition color value for each pixel in the first pixelated image to generate the second pixelated image.

20. The computer program product of claim 17, wherein before obtaining the second pixelated image based on the orientation information, the first pixelated image, the light source, and the pixelated mask image, the computer instructions, when executed by the processor, further cause the terminal to:

normalize the orientation information; and move the light source based on normalized orientation information.

* * * * *